United States Patent
Kester et al.

(10) Patent No.: US 9,692,790 B2
(45) Date of Patent: *Jun. 27, 2017

(54) SYSTEM AND METHOD OF MONITORING AND CONTROLLING APPLICATION FILES

(71) Applicant: Websense, LLC, Austin, TX (US)

(72) Inventors: Harold M. Kester, Cardiff, CA (US); John Ross Dimm, San Diego, CA (US); Mark Richard Anderson, Tempe, AZ (US); Joseph Papa, Carlsbad, CA (US)

(73) Assignee: Websense, LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/011,371

(22) Filed: Jan. 29, 2016

(65) Prior Publication Data
US 2016/0149957 A1     May 26, 2016

Related U.S. Application Data

(60) Continuation of application No. 14/172,803, filed on Feb. 4, 2014, now Pat. No. 9,253,060, which is a
(Continued)

(51) Int. Cl.
*G06F 17/30*      (2006.01)
*H04L 29/06*      (2006.01)
(Continued)

(52) U.S. Cl.
CPC .......... *H04L 63/20* (2013.01); *G06F 11/3476* (2013.01); *G06F 17/30864* (2013.01);
(Continued)

(58) Field of Classification Search
CPC ...... G06F 11/3476; G06F 21/55; G06F 21/57; G06F 2221/2101; G06F 21/50;
(Continued)

(56) References Cited

U.S. PATENT DOCUMENTS 3,915,079 A    10/1975   Balderson
3,955,713 A     5/1976   Hurley et al.
(Continued)

FOREIGN PATENT DOCUMENTS

EP     0 658 837      6/1995
EP     0748095 A2    12/1996
(Continued)

OTHER PUBLICATIONS

Forte, M. et al., "A content classification and filtering server for the Internet", Applied Computing 2006. 21st Annual ACM Symposium on Applied Computing, [online]http://portal.acm.org/citation.cfm?id=1141553&coll=portal&dl=ACM&CFID=2181828&CFTOKEN=68827537>[retrieved on Dec. 7, 2007] Apr. 23, 2006-Apr. 27, 2006, pp. 1166-1171.
(Continued)

*Primary Examiner* — Anh Ly
(74) *Attorney, Agent, or Firm* — Schwegman Lundberg & Woessner, P.A.

(57) ABSTRACT

A system and method for updating, monitoring, and controlling applications on a workstation. The workstation includes a workstation management module configured to detect the launch or request to access a network by an application. A workstation application server receives data associated with the application from the workstation. The application server module can determine one or more policies or categories to associate with the application by referencing an application inventory database. Once the application server module has the category or policy, it forwards a hash/policy table to the workstation management module. Upon receipt of the hash/policy table, the workstation management module applies the policy that is associated with the application to control network access by the application.

17 Claims, 21 Drawing Sheets

Related U.S. Application Data continuation of application No. 13/437,885, filed on Apr. 2, 2012, now Pat. No. 8,645,340, which is a continuation of application No. 12/403,313, filed on Mar. 12, 2009, now Pat. No. 8,150,817, which is a division of application No. 11/134,815, filed on May 19, 2005, now Pat. No. 7,529,754, which is a continuation-in-part of application No. 10/390,547, filed on Mar. 14, 2003, now Pat. No. 7,185,015.

(51) Int. Cl.
| | |
|---|---|
| *G06F 11/34* | (2006.01) |
| *G06F 21/50* | (2013.01) |
| *G06F 21/55* | (2013.01) |
| *G06F 21/57* | (2013.01) |
| *H04L 12/26* | (2006.01) |

(52) U.S. Cl.
CPC .............. *G06F 21/50* (2013.01); *G06F 21/55* (2013.01); *G06F 21/57* (2013.01); *H04L 12/2602* (2013.01); *H04L 43/00* (2013.01); *H04L 43/08* (2013.01); *H04L 63/10* (2013.01); *H04L 63/102* (2013.01); *H04L 63/1408* (2013.01); *H04L 63/1416* (2013.01); *H04L 67/42* (2013.01); *G06F 2221/2101* (2013.01); *H04L 43/0817* (2013.01); *H04L 63/0428* (2013.01); *Y10S 707/99943* (2013.01); *Y10S 707/99945* (2013.01)

(58) Field of Classification Search
CPC ..... H04L 43/08; H04L 12/2602; H04L 43/00; H04L 43/0817; H04L 63/0428; H04L 63/102; H04L 63/1408; H04L 63/1416; H04L 63/20; H04L 67/42; Y10S 707/99943; Y10S 707/99945
See application file for complete search history.

(56) References Cited

U.S. PATENT DOCUMENTS

| | | |
|---|---|---|
| 4,151,790 A | 5/1979 | Spirk |
| 4,382,402 A | 5/1983 | Alvarez |
| 4,423,414 A | 12/1983 | Bryant et al. |
| 4,674,400 A | 6/1987 | Rondel et al. |
| 4,875,408 A | 10/1989 | Mcgee |
| 4,924,384 A | 5/1990 | Hao et al. |
| 4,941,084 A | 7/1990 | Terada et al. |
| 5,049,713 A | 9/1991 | Creyaufmuller |
| 5,123,335 A | 6/1992 | Aselu |
| 5,233,914 A | 8/1993 | English |
| 5,274,736 A | 12/1993 | Rohr, Jr. |
| 5,377,581 A | 1/1995 | Campbell |
| 5,434,392 A | 7/1995 | Belinkoff |
| 5,465,353 A | 11/1995 | Hull et al. |
| 5,493,692 A | 2/1996 | Theimer et al. |
| 5,515,513 A | 5/1996 | Metzger et al. |
| 5,541,911 A | 7/1996 | Nilakantan et al. |
| 5,548,729 A | 8/1996 | Akiyoshi et al. |
| 5,549,610 A | 8/1996 | Russell et al. |
| 5,555,376 A | 9/1996 | Theimer et al. |
| 5,581,703 A | 12/1996 | Baugher et al. |
| 5,606,668 A | 2/1997 | Shwed |
| 5,619,648 A | 4/1997 | Canale et al. |
| 5,643,086 A | 7/1997 | Alcorn et al. |
| 5,678,041 A | 10/1997 | Baker et al. |
| 5,682,325 A | 10/1997 | Lightfoot et al. |
| 5,696,486 A | 12/1997 | Poliquin et al. |
| 5,696,898 A | 12/1997 | Baker et al. |
| 5,706,507 A | 1/1998 | Schloss |
| 5,734,380 A | 3/1998 | Adams et al. |
| 5,774,668 A | 6/1998 | Choquier et al. |
| 5,787,253 A | 7/1998 | McCreery et al. |
| 5,787,427 A | 7/1998 | Benantar et al. |
| 5,799,002 A | 8/1998 | Krishnan |
| 5,801,747 A | 9/1998 | Bedard |
| 5,832,212 A | 11/1998 | Cragun et al. |
| 5,832,228 A | 11/1998 | Holden et al. |
| 5,832,503 A | 11/1998 | Malik et al. |
| 5,835,722 A | 11/1998 | Bradshaw et al. |
| 5,848,233 A | 12/1998 | Radia et al. |
| 5,848,412 A | 12/1998 | Rowland et al. |
| 5,850,523 A | 12/1998 | Gretta, Jr. |
| 5,855,020 A | 12/1998 | Kirsch |
| 5,884,033 A | 3/1999 | Duvall et al. |
| 5,884,325 A | 3/1999 | Bauer et al. |
| 5,889,958 A | 3/1999 | Willens |
| 5,892,905 A | 4/1999 | Brandt et al. |
| 5,896,502 A | 4/1999 | Shieh et al. |
| 5,899,991 A | 5/1999 | Karch |
| 5,899,995 A | 5/1999 | Millier et al. |
| 5,902,620 A | 5/1999 | Nolan |
| 5,911,043 A | 6/1999 | Duffy et al. |
| 5,919,257 A | 7/1999 | Trostle |
| 5,936,830 A | 8/1999 | Rousseau et al. |
| 5,941,947 A | 8/1999 | Brown et al. |
| 5,944,821 A | 8/1999 | Angelo |
| 5,958,015 A | 9/1999 | Dascalu |
| 5,961,591 A | 10/1999 | Jones et al. |
| 5,968,176 A | 10/1999 | Nessett et al. |
| 5,978,807 A | 11/1999 | Mano et al. |
| 5,983,279 A | 11/1999 | Lin et al. |
| 5,987,606 A | 11/1999 | Cirasole et al. |
| 5,987,611 A | 11/1999 | Freund |
| 5,991,807 A | 11/1999 | Schmidt et al. |
| 5,996,011 A | 11/1999 | Humes |
| 5,999,740 A | 12/1999 | Rowley |
| 5,999,932 A | 12/1999 | Paul |
| 6,026,333 A | 2/2000 | Koyabu et al. |
| 6,037,570 A | 3/2000 | Noles |
| 6,052,709 A | 4/2000 | Paul |
| 6,052,723 A | 4/2000 | Ginn |
| 6,055,564 A | 4/2000 | Phaal |
| 6,065,059 A | 5/2000 | Shieh et al. |
| 6,085,241 A | 7/2000 | Otis |
| 6,092,194 A | 7/2000 | Touboul |
| 6,094,487 A | 7/2000 | Butler et al. |
| 6,105,027 A | 8/2000 | Schneider et al. |
| 6,123,010 A | 9/2000 | Blackstone |
| 6,144,934 A | 11/2000 | Stockwell et al. |
| 6,154,741 A | 11/2000 | Feldman |
| 6,167,358 A * | 12/2000 | Othmer ............... G06F 11/0748 709/217 |
| 6,167,457 A | 12/2000 | Eidson et al. |
| 6,167,538 A | 12/2000 | Neufeld et al. |
| 6,169,406 B1 | 1/2001 | Peschel |
| 6,178,417 B1 | 1/2001 | Syeda-Mahmood et al. |
| 6,182,118 B1 | 1/2001 | Finney et al. |
| 6,189,026 B1 | 2/2001 | Birrell et al. |
| 6,195,698 B1 | 2/2001 | Lillibridge et al. |
| 6,199,081 B1 | 3/2001 | Meyerzon et al. |
| 6,199,102 B1 | 3/2001 | Cobb |
| 6,226,664 B1 | 5/2001 | Ng et al. |
| 6,233,618 B1 | 5/2001 | Shannon |
| 6,249,805 B1 | 6/2001 | Fleming, III et al. |
| 6,256,739 B1 | 7/2001 | Skopp et al. |
| 6,295,559 B1 | 9/2001 | Emens et al. |
| 6,310,966 B1 | 10/2001 | Dulude et al. |
| 6,321,267 B1 | 11/2001 | Donaldson |
| 6,324,578 B1 | 11/2001 | Cox et al. |
| 6,330,590 B1 | 12/2001 | Cotten |
| 6,338,088 B1 | 1/2002 | Waters et al. |
| 6,418,433 B1 | 7/2002 | Chakrabarti et al. |
| 6,446,119 B1 | 9/2002 | Olah et al. |
| 6,456,306 B1 | 9/2002 | Chin et al. |
| 6,460,050 B1 | 10/2002 | Pace et al. |
| 6,460,141 B1 | 10/2002 | Olden |
| 6,466,940 B1 | 10/2002 | Mills |
| 6,486,892 B1 | 11/2002 | Stern |
| 6,505,201 B1 | 1/2003 | Haitsuka et al. |
| 6,519,571 B1 | 2/2003 | Guheen et al. |
| 6,560,632 B1 | 5/2003 | Chess et al. |

(56) References Cited

U.S. PATENT DOCUMENTS

| | | |
|---|---|---|
| 6,564,327 B1 | 5/2003 | Klensin et al. |
| 6,606,659 B1 | 8/2003 | Hegli et al. |
| 6,728,766 B2 | 4/2004 | Cox et al. |
| 6,741,997 B1 | 5/2004 | Liu et al. |
| 6,769,009 B1 | 7/2004 | Reisman |
| 6,772,214 B1 | 8/2004 | McClain et al. |
| 6,772,346 B1 | 8/2004 | Chess et al. |
| 6,804,780 B1 | 10/2004 | Touboul |
| 6,832,230 B1 | 12/2004 | Zilliacus et al. |
| 6,894,991 B2 | 5/2005 | Ayyagari et al. |
| 6,944,772 B2 | 9/2005 | Dozortsev |
| 6,947,935 B1 | 9/2005 | Horvitz et al. |
| 6,947,985 B2 | 9/2005 | Hegli et al. |
| 6,978,292 B1 | 12/2005 | Murakami et al. |
| 6,984,991 B2 | 1/2006 | Bond et al. |
| 6,988,209 B1 | 1/2006 | Balasubramaniam et al. |
| 7,058,822 B2 | 6/2006 | Edery et al. |
| 7,080,000 B1 | 7/2006 | Cambridge |
| 7,089,246 B1 | 8/2006 | O'laughlen |
| 7,093,293 B1 | 8/2006 | Smithson et al. |
| 7,096,493 B1 | 8/2006 | Liu |
| 7,139,999 B2 | 11/2006 | Bowman-Amuah |
| 7,185,015 B2 | 2/2007 | Kester et al. |
| 7,185,361 B1 | 2/2007 | Ashoff et al. |
| 7,194,464 B2 | 3/2007 | Kester et al. |
| 7,197,713 B2 | 3/2007 | Stern |
| 7,210,041 B1 | 4/2007 | Gryaznov et al. |
| 7,280,529 B1 | 10/2007 | Black et al. |
| 7,299,277 B1 | 11/2007 | Moran et al. |
| 7,313,823 B2 | 12/2007 | Gao |
| 7,376,154 B2 | 5/2008 | Ilnicki et al. |
| 7,376,969 B1 | 5/2008 | Njemanze et al. |
| 7,409,720 B1 | 8/2008 | Cambridge et al. |
| 7,415,439 B2 | 8/2008 | Kontio et al. |
| 7,418,733 B2 | 8/2008 | Connary et al. |
| 7,496,960 B1 | 2/2009 | Chen et al. |
| 7,529,254 B2 | 5/2009 | Tsuge et al. |
| 7,529,754 B2 | 5/2009 | Kester et al. |
| 7,603,685 B2 | 10/2009 | Knudson et al. |
| 7,603,687 B2 | 10/2009 | Pietraszak et al. |
| 7,797,270 B2 | 9/2010 | Kester et al. |
| 8,010,469 B2 | 8/2011 | Kapoor et al. |
| 8,020,209 B2 | 9/2011 | Kester et al. |
| 8,150,817 B2 | 4/2012 | Kester et al. |
| 8,645,340 B2 | 2/2014 | Kester et al. |
| 8,689,325 B2 | 4/2014 | Kester et al. |
| 8,701,194 B2 | 4/2014 | Kester et al. |
| 9,253,060 B2 | 2/2016 | Kester et al. |
| 9,342,693 B2 | 5/2016 | Kester et al. |
| 2001/0013064 A1 | 8/2001 | Cox et al. |
| 2001/0032258 A1 | 10/2001 | Ishida et al. |
| 2001/0039582 A1 | 11/2001 | McKinnon et al. |
| 2001/0047474 A1* | 11/2001 | Takagi ............... H04L 63/04 |
| | | 713/151 |
| 2002/0073089 A1 | 6/2002 | Schwartz et al. |
| 2002/0078045 A1 | 6/2002 | Dutta |
| 2002/0095592 A1 | 7/2002 | Daniell et al. |
| 2002/0099952 A1* | 7/2002 | Lambert ............... G06F 21/126 |
| | | 726/27 |
| 2002/0129039 A1 | 9/2002 | Majewski et al. |
| 2002/0129277 A1 | 9/2002 | Caccavale |
| 2002/0133509 A1* | 9/2002 | Johnston ............... G06F 17/243 |
| | | 707/E17.007 |
| 2002/0152284 A1 | 10/2002 | Cambray et al. |
| 2002/0166001 A1 | 11/2002 | Cheng et al. |
| 2002/0174010 A1 | 11/2002 | Rice, III |
| 2002/0174358 A1 | 11/2002 | Wolff et al. |
| 2002/0194194 A1 | 12/2002 | Fenton et al. |
| 2003/0005112 A1 | 1/2003 | Krautkremer |
| 2003/0018903 A1 | 1/2003 | Greca et al. |
| 2003/0023860 A1 | 1/2003 | Eatough et al. |
| 2003/0033525 A1 | 2/2003 | Rajaram |
| 2003/0051027 A1 | 3/2003 | Aupperle et al. |
| 2003/0061279 A1 | 3/2003 | Llewellyn et al. |
| 2003/0074567 A1 | 4/2003 | Charbonneau |
| 2003/0088545 A1 | 5/2003 | Subramaniam et al. |
| 2003/0088680 A1 | 5/2003 | Nachenberg et al. |
| 2003/0105973 A1 | 6/2003 | Liang et al. |
| 2003/0110479 A1 | 6/2003 | Rajaram |
| 2003/0126136 A1 | 7/2003 | Omoigui |
| 2003/0126139 A1 | 7/2003 | Lee et al. |
| 2003/0147369 A1 | 8/2003 | Singh et al. |
| 2003/0154399 A1 | 8/2003 | Zuk et al. |
| 2003/0177187 A1 | 9/2003 | Levine et al. |
| 2003/0229779 A1 | 12/2003 | Morais et al. |
| 2003/0236894 A1 | 12/2003 | Herley |
| 2004/0003286 A1 | 1/2004 | Kaler et al. |
| 2004/0015566 A1 | 1/2004 | Anderson et al. |
| 2004/0019656 A1 | 1/2004 | Smith et al. |
| 2004/0030913 A1 | 2/2004 | Liang et al. |
| 2004/0044912 A1 | 3/2004 | Connary et al. |
| 2004/0054498 A1 | 3/2004 | Shipp |
| 2004/0068479 A1 | 4/2004 | Wolfson et al. |
| 2004/0078591 A1 | 4/2004 | Teixeira et al. |
| 2004/0093167 A1 | 5/2004 | Braig et al. |
| 2004/0111499 A1 | 6/2004 | Dobrowski et al. |
| 2004/0117624 A1 | 6/2004 | Brandt et al. |
| 2004/0139309 A1 | 7/2004 | Gentil et al. |
| 2004/0153644 A1 | 8/2004 | McCorkendale et al. |
| 2004/0153666 A1 | 8/2004 | Sobel |
| 2004/0162876 A1* | 8/2004 | Kohavi ............... G06F 17/30943 |
| | | 709/203 |
| 2004/0181788 A1 | 9/2004 | Kester et al. |
| 2004/0187029 A1 | 9/2004 | Ting |
| 2004/0193652 A1 | 9/2004 | Wendker et al. |
| 2004/0220924 A1 | 11/2004 | Wootton |
| 2004/0254809 A1 | 12/2004 | Teicher |
| 2005/0004875 A1 | 1/2005 | Kontio et al. |
| 2005/0055519 A1 | 3/2005 | Stuart et al. |
| 2005/0066197 A1 | 3/2005 | Hirata et al. |
| 2005/0091535 A1 | 4/2005 | Kavalam et al. |
| 2005/0108557 A1 | 5/2005 | Kayo et al. |
| 2005/0120229 A1 | 6/2005 | Lahti |
| 2005/0131868 A1 | 6/2005 | Lin et al. |
| 2005/0132184 A1 | 6/2005 | Palliyil et al. |
| 2005/0139650 A1 | 6/2005 | Gonzalo |
| 2005/0149759 A1 | 7/2005 | Vishwanath et al. |
| 2005/0155012 A1* | 7/2005 | Tayama ............... G06F 8/60 |
| | | 717/101 |
| 2005/0210035 A1 | 9/2005 | Kester et al. |
| 2005/0223001 A1 | 10/2005 | Kester et al. |
| 2005/0251862 A1 | 11/2005 | Talvitie |
| 2005/0273858 A1 | 12/2005 | Zadok et al. |
| 2006/0004636 A1 | 1/2006 | Kester et al. |
| 2006/0026105 A1 | 2/2006 | Endoh |
| 2006/0031504 A1 | 2/2006 | Hegli et al. |
| 2006/0036874 A1 | 2/2006 | Cockerille et al. |
| 2006/0064596 A1 | 3/2006 | Feinleib et al. |
| 2006/0080735 A1 | 4/2006 | Brinson et al. |
| 2006/0095586 A1 | 5/2006 | Adelman et al. |
| 2006/0095965 A1 | 5/2006 | Phillips et al. |
| 2006/0191008 A1 | 8/2006 | Fernando et al. |
| 2006/0259948 A1 | 11/2006 | Calow et al. |
| 2006/0265750 A1 | 11/2006 | Huddleston |
| 2007/0005762 A1 | 1/2007 | Knox et al. |
| 2007/0028302 A1 | 2/2007 | Brennan |
| 2007/0053513 A1 | 3/2007 | Hoffberg |
| 2007/0111799 A1 | 5/2007 | Robb et al. |
| 2007/0180477 A1 | 8/2007 | Hutcheson |
| 2007/0204223 A1 | 8/2007 | Bartels et al. |
| 2008/0046281 A1 | 2/2008 | Teicher |
| 2008/0046282 A1 | 2/2008 | Teicher |
| 2008/0201415 A1 | 8/2008 | Herley |
| 2008/0214300 A1 | 9/2008 | Williams et al. |
| 2008/0267144 A1 | 10/2008 | Jano et al. |
| 2008/0295177 A1 | 11/2008 | Dettinger et al. |
| 2009/0216641 A1 | 8/2009 | Hubbard |
| 2009/0216729 A1 | 8/2009 | Kester et al. |
| 2012/0191676 A1 | 7/2012 | Kester et al. |

(56) References Cited

U.S. PATENT DOCUMENTS

| | | |
|---|---|---|
| 2014/0156838 A1 | 6/2014 | Kester et al. |
| 2016/0253499 A1 | 9/2016 | Kester |

FOREIGN PATENT DOCUMENTS

| | | |
|---|---|---|
| EP | 1280040 A2 | 1/2003 |
| EP | 1 280 040 | 3/2004 |
| EP | 1 457 885 | 9/2004 |
| EP | 1 130 495 | 1/2006 |
| EP | 1 638 016 | 3/2006 |
| JP | 2000235540 A | 8/2000 |
| WO | WO 92/19054 | 10/1992 |
| WO | WO 96/05549 A1 | 2/1996 |
| WO | WO 96/42041 | 12/1996 |
| WO | WO 01/24012 | 4/2001 |
| WO | WO-0124012 A1 | 4/2001 |
| WO | WO 01/33371 | 5/2001 |
| WO | WO 01/55873 | 8/2001 |
| WO | WO 01/55905 | 8/2001 |
| WO | WO 01/63835 | 8/2001 |
| WO | WO 2005/099340 | 4/2006 |

OTHER PUBLICATIONS

Ang, P. H. et al., "Censorship and the Internet: A Singapore Perspective", Communications of the Association for computing machinery, Jun. 1, 1996, vol. 39, Issue 6, pp. 72-78, New York, NY.
Basney et al., Improving Goodput by Coscheduling CPU and Network Capacity, The International Journal of High Performance Computing Applications, Fall 1999, vol. 13, Issue 3, pp. 220-230.
Dahan, M. Ed., "The Internet and government censorship: the case of the Israeli secretservice" Online information, Proceedings of the International Online Information Meeting, Oxford, Learned Infomration, GB. Dec. 12-14, 1989, vol. meeting 13, December, Issue XP000601363, pp. 41-48, Sections 1.3, London.
Igakura, Tomohiro et al., Specific quality measurement and control of the service-oriented networking application, Technical Report of IEICE, IEICE Association, Jan. 18, 2002, vol. 101, Issue 563, pp. 51-56, Japan.
IronPort Web Reputation White Paper, A Comprehensive, Proactive Approach to Web-Based Threats, Ironport Systems, 2009, pp. 10.
IronPort Web Reputation: Protect and Defend Against URL-Based Threats; Ironport Systems, Apr. 2006, 8 pages.
Jiang et al., Towards Junking the PBC: Deploying IP Telephony, NOSSDAV'01 Proceedings of the 11th International Workship on Network and Operating Systems Support for Digital Audio and Video, Jun. 25-26, 2001, pp. 177-185, New York.
Ong et al., Unicorn: Voluntary Computing over Internet, ACM SIGOPS Operating Systems Review, vol. 36, Issue 2, Apr. 2002, pp. 36-51.
Resnick, P. et al., "PICS: Internet Access Controls Without Censorship", Communications of the Association for Comuting Machinery, ACM, Oct. 1, 1996, vol. 39, Issue 10, pp. 87-93, New York, NY.
Rose et al., Current Technological Impediments to Business-to-Consumer Electronic Commerce, Communications of AIS, Jun. 1999, vol. 1, Issue 5, pp. 1-76, Article 16.
Schmid et al., Protecting Data from Malicious Software, IEEE, Proceedings of the 18th Annual Computer Security Applications Conference, 2002.
Williams, R., Data Integrity with Veracity, Retrieved from the Internet: <URL: ftp://ftp.rocksoft.com/clients/rocksoft/papers/vercty10.ps>, Sep. 12, 1994.
Sandhu, et al., Access Control: Principles and Practice, IEEE Communications Magazine, pp. 40-48, Sep. 1994.
C. L. Schuba and E. H. Spafford. Countering abuse of name-based authentication. In 22nd Annual Telecommunications Policy Research Conference, 21 pp., 1996.
SurfControl plc, SuperScout Web Filter Reviewer's Guide, 36 pp., 2002.
Yialetts, et al., Role-Based Security for Distributed Object Systems, Proceedings of the IEEE Fifty Workshops on Enabling Technology: Infrastructure for Collaborative Enterprises (WET ICE '96): 6 pp., Jun. 19-21, 1996.
Supplementaty European Search Report for EPO App. No. 00 90 7076, mailed May 18, 2004.
Roberts-Witt, S., The 1999 Utility Guide: Corporate Filtering, PC Magazine Online, Apr. 5, 1999, pp. 1-11.
Sequel Technology, Inc., Sequel and Surfwatch Partner to Provide Innovative Internet Resource Management Tools for Large Enterprises, Internet, Online!, Feb. 25, 1999, pp. 1-3.
SurfWatch Software, SurfWatch.RTM Professional Edition: Product Overview, Internet, Online!, May 26, 1999, p. 1.
Newman, H., A Look at Some Popular Filtering Systems, Internet, Online, Jul. 25, 1999, pp. 1-11.
Secure Computing Coporation; SmartFilter.TM. Web Tool, Dec. 1, 1998, pp. 1-2.
European Search Report for Application No. 02258462.7, mailed Jan. 30, 2006.
PCT Search Report for Application No. PCT/US2006/018823, mailed Sep. 25, 2006.
Schmid et al., Protecting Data from Malicious Software, IEEE; Proceedings of the 18th Annual Computer Security Applications Conference, 2002.
Selvaraj et al., "Implementation of a database factory", Newsletter ACM SIGPLAN Notices Homepage archive;, Jun. 1997, vol. 32, Issue 6, pp. 14-18.
Tohma, Yoshihiro, "Fault Tolerance in Autonomic Computing Environment", Dependable Computing—Proceedings 2002 Pacific Rim International Symposium on Dependable Computing, Dec. 16, 2002, pp. 3-6, Tokyo, Japan.
"U.S. Appl. No. 10/390,547, Examiner Interview Summary mailed Jan. 20, 2006", 4 pgs.
"U.S. Appl. No. 10/390,547, Final Office Action mailed Jun. 14, 2006", 13 pgs.
"U.S. Appl. No. 10/390,547, Non Final Office Action mailed Jun. 14, 2006", 12 pgs.
"U.S. Appl. No. 10/390,547, Non Final Office Action mailed Dec. 27, 2005", 32 pgs.
"U.S. Appl. No. 10/390,547, Notice of Allowance mailed Oct. 13, 2006", 7 pgs.
"U.S. Appl. No. 10/390,547, Preliminary Amendment filed Oct. 4, 2005", 9 pgs.
"U.S. Appl. No. 10/390,547, Response filed Mar. 27, 2006 to Non Final Office Action mailed Dec. 27, 2005", 19 pgs.
"U.S. Appl. No. 10/390,547, Response filed Sep. 13, 2006 to Final Office Action mailed Jun. 14, 2006", 11 pgs.
"U.S. Appl. No. 10/390,547, Response filed Oct. 4, 2005 to Restriction Requirement mailed Sep. 7, 2005", 2 pgs.
"U.S. Appl. No. 10/390,547, Restriction Requirement mailed Sep. 7, 2005", 5 pgs.
"U.S. Appl. No. 11/134,815, Non Final Office Action mailed Jun. 12, 2008", 24 pgs.
"U.S. Appl. No. 11/134,815, Notice of Allowance mailed Dec. 15, 2008", 13 pgs.
"U.S. Appl. No. 11/134,815, Response filed Apr. 29, 2008 to Restriction Requirement mailed Apr. 21, 2008", 2 pgs.
"U.S. Appl. No. 11/134,815, Response filed Sep. 12, 2008 to Non Final Office Action mailed Jun. 12, 2008", 12 pgs.
"U.S. Appl. No. 11/134,815, Restriction Requirement mailed Apr. 21, 2008", 7 pgs.
"U.S. Appl. No. 11/143,006, Advisory Action mailed Jun. 29, 2010", 3 pgs.
"U.S. Appl. No. 11/143,006, Final Office Action mailed Apr. 15, 2010", 14 pgs.
"U.S. Appl. No. 11/143,006, Non Final Office Action mailed Aug. 7, 2009", 13 pgs.
"U.S. Appl. No. 11/143,006, Notice of Allowance mailed Jan. 7, 2011", 8 pgs.
"U.S. Appl. No. 11/143,006, Notice of Allowance mailed Apr. 13, 2011", 5 pgs.

(56) References Cited

OTHER PUBLICATIONS

"U.S. Appl. No. 11/143,006, Notice of Allowance mailed Jul. 20, 2011", 5 pgs.
"U.S. Appl. No. 11/143,006, Notice of Non-Compliant Amendment mailed Dec. 31, 2009", 2 pgs.
"U.S. Appl. No. 11/143,006, Response filed Jan. 7, 2010 to Notice of Non-Compliant Amendment mailed Dec. 31, 2009", 7 pgs.
"U.S. Appl. No. 11/143,006, Response filed Apr. 16, 2009 to Restriction Requirement mailed Apr. 2, 2009", 2 pgs.
"U.S. Appl. No. 11/143,006, Response filed Jun. 15, 2010 to Final Office Action mailed Apr. 15, 2010", 10 pgs.
"U.S. Appl. No. 11/143,006, Response filed Jul. 15, 2010 to Advisory Action mailed Jun. 29, 2010", 10 pgs.
"U.S. Appl. No. 11/143,006, Response filed Nov. 9, 2009 to Non Final Office Action mailed Aug. 7, 2009", 8 pgs.
"U.S. Appl. No. 11/143,006, Restriction Requirement mailed Apr. 2, 2009", 6 pgs.
"U.S. Appl. No. 11/146,318, Advisory Action mailed Aug. 27, 2012", 4 pgs.
"U.S. Appl. No. 11/146,318, Examiner Interview Summary mailed Mar. 16, 2009", 2 pgs.
"U.S. Appl. No. 11/146,318, Examiner Interview Summary mailed Jun. 22, 2011", 3 pgs.
"U.S. Appl. No. 11/146,318, Final Office Action mailed Mar. 15, 2011", 16 pgs.
"U.S. Appl. No. 11/146,318, Final Office Action mailed Jun. 7, 2012", 16 pgs.
"U.S. Appl. No. 11/146,318, Final Office Action mailed Jun. 18, 2010", 17 pgs.
"U.S. Appl. No. 11/146,318, Final Office Action mailed Aug. 25, 2009", 13 pgs.
"U.S. Appl. No. 11/146,318, Non Final Office Action mailed Jan. 5, 2010", 17 pgs.
"U.S. Appl. No. 11/146,318, Non Final Office Action mailed Feb. 19, 2009", 13 pgs.
"U.S. Appl. No. 11/146,318, Non Final Office Action mailed Nov. 4, 2010", 16 pgs.
"U.S. Appl. No. 11/146,318, Non Final Office Action mailed Dec. 5, 2012", 18 pgs.
"U.S. Appl. No. 11/146,318, Non Final Office Action mailed Dec. 22, 2011", 16 pgs.
"U.S. Appl. No. 11/146,318, Notice of Allowance mailed Jun. 26, 2013", 16 pgs.
"U.S. Appl. No. 11/146,318, Response filed Feb. 4, 2011 to Non Final Office Action mailed Nov. 4, 2010", 17 pgs.
"U.S. Appl. No. 11/146,318, Response filed Mar. 22, 2012 to Non Final Office Action mailed Dec. 22, 2011", 17 pgs.
"U.S. Appl. No. 11/146,318, Response filed Mar. 26, 2013 to Non Final Office Action mailed Dec. 5, 2012", 19 pgs.
"U.S. Appl. No. 11/146,318, Response filed Apr. 5, 2010 to Non Final Office Action mailed Jan. 5, 2010", 20 pgs.
"U.S. Appl. No. 11/146,318, Response filed Jun. 15, 2011 to Final Office Action mailed Mar. 15, 2011", 18 pgs.
"U.S. Appl. No. 11/146,318, Response filed Jun. 18, 2009 to Non Final Office Action mailed Feb. 19, 2009", 22 pgs.
"U.S. Appl. No. 11/146,318, Response filed Aug. 10, 2012 to Final Office Action mailed Jun. 7, 2012", 18 pgs.
"U.S. Appl. No. 11/146,318, Response filed Sep. 7, 2012 to Advisory Action mailed Aug. 27, 2012", 17 pgs.
"U.S. Appl. No. 11/146,318, Response filed Sep. 20, 2010 to Final Office Action mailed Jun. 18, 2010", 17 pgs.
"U.S. Appl. No. 11/146,318, Response filed Nov. 25, 2009 to Final Office Action mailed Aug. 25, 2009", 19 pgs.
"U.S. Appl. No. 11/624,635, Examiner Interview Summary mailed Mar. 13, 2009", 2 pgs.
"U.S. Appl. No. 11/624,635, Non Final Office Action mailed Jan. 26, 2009", 25 pgs.
"U.S. Appl. No. 11/624,635, Notice of Allowance mailed Jan. 12, 2010", 4 pgs.
"U.S. Appl. No. 11/624,635, Notice of Allowance mailed Apr. 28, 2010", 4 pgs.
"U.S. Appl. No. 11/624,635, Notice of Allowance mailed Sep. 4, 2009", 14 pgs.
"U.S. Appl. No. 11/624,635, Response filed Apr. 27, 2009 to Non Final Office Action mailed Jan. 26, 2009", 15 pgs.
"U.S. Appl. No. 12/403,313, Applicant's Summary of Examiner Interview filed Jul. 13, 2011", 5 pgs.
"U.S. Appl. No. 12/403,313, Examiner Interview Summary mailed Jul. 27, 2011", 3 pgs.
"U.S. Appl. No. 12/403,313, Non Final Office Action mailed Apr. 28, 2011", 29 pgs.
"U.S. Appl. No. 12/403,313, Notice of Allowance mailed Nov. 28, 2011", 11 pgs.
"U.S. Appl. No. 12/403,313, Response filed Aug. 12, 2011 to Non Final Office Action mailed Apr. 28, 2011", 10 pgs.
"U.S. Appl. No. 13/230,661, Advisory Action mailed Jul. 2, 2013", 3 pgs.
"U.S. Appl. No. 13/230,661, Final Office Action mailed Apr. 22, 2013", 13 pgs.
"U.S. Appl. No. 13/230,661, Non Final Office Action mailed Jan. 3, 2013", 11 pgs.
"U.S. Appl. No. 13/230,661, Notice of Allowance mailed Aug. 13, 2013", 8 pgs.
"U.S. Appl. No. 13/230,661, Notice of Allowance mailed Dec. 6, 2013", 7 pgs.
"U.S. Appl. No. 13/230,661, Response filed Mar. 26, 2013 to Non Final Office Action mailed Jan. 3, 2013", 9 pgs.
"U.S. Appl. No. 13/230,661, Response filed Jun. 21, 2013 to Final Office Action mailed Apr. 22, 2013", 8 pgs.
"U.S. Appl. No. 13/437,885, Non Final Office Action mailed Nov. 8, 2012", 37 pgs.
"U.S. Appl. No. 13/437,885, Notice of Allowance mailed Jun. 10, 2013", 19 pgs.
"U.S. Appl. No. 13/437,885, Notice of Allowance mailed Sep. 23, 2013", 12 pgs.
"U.S. Appl. No. 13/437,885, Response filed Apr. 1, 2013 to Non Final Office Action mailed Nov. 8, 2012", 15 pgs.
"U.S. Appl. No. 14/076,940, Advisory Action mailed Apr. 13, 2015", 3 pgs.
"U.S. Appl. No. 14/076,940, Ex Parte Quayle Action mailed Jun. 8, 2015", 5 pgs.
"U.S. Appl. No. 14/076,940, Final Office Action mailed Feb. 2, 2015", 14 pgs.
"U.S. Appl. No. 14/076,940, Non Final Office Action mailed Oct. 6, 2014", 19 pgs.
"U.S. Appl. No. 14/076,940, Notice of Allowance mailed Jan. 15, 2016", 9 pgs.
"U.S. Appl. No. 14/076,940, Response filed Apr. 1, 2015 to Final Office Action mailed Feb. 2, 2015", 8 pgs.
"U.S. Appl. No. 14/076,940, Response filed Dec. 26, 2014 to Non Final Office Action mailed Oct. 6, 2014", 11 pgs.
"U.S. Appl. No. 14/172,803, Ex Parte Quayle Action mailed Mar. 12, 2015", 5 pgs.
"U.S. Appl. No. 14/172,803, Non Final Office Action mailed Oct. 24, 2014", 38 pgs.
"U.S. Appl. No. 14/172,803, Notice of Allowance mailed May 8, 2015", 11 pgs.
"U.S. Appl. No. 14/172,803, Notice of Allowance mailed Sep. 10, 2015", 10 pgs.
"U.S. Appl. No. 14/172,803, Response filed Jan. 23, 2015 to Non Final Office Action mailed Oct. 24, 2014", 13 pgs.
"U.S. Appl. No. 14/172,803, Response filed Apr. 21, 2016 to Ex Parte Quayle Action mailed Mar. 12, 2015", 16 pgs.
"U.S. Appl. No. 15/150,308, Non Final Office Action mailed Jun. 27, 2016", 15 pgs.
"U.S. Appl. No. 15/150,308, Notice of Allowance mailed Nov. 18, 2016", 9 pgs.
"U.S. Appl. No. 15/150,308, Response filed Sep. 26, 2016 to Non Final Office Action mailed Jun. 27, 2016", 8 pgs.
"Australian Application Serial No. 2004200620, Examiner's Report 2 mailed Jan. 18, 2010", 2 pgs.

(56) References Cited

OTHER PUBLICATIONS

"Australian Application Serial No. 2004200620, Examiner's Report mailed Mar. 31, 2009", 2 pgs.
"Australian Application Serial No. 2004200620, Response filed Mar. 24, 2010 to Examiner's Report 2 mailed Jan. 18, 2010", 2 pgs.
"Australian Application Serial No. 2004200620, Response filed Dec. 16, 2009 to Examiner's Report mailed Mar. 31, 2009", 2 pgs.
"Australian Application Serial No. 2006247382, Examiner Report mailed Nov. 15, 2010", 2 pgs.
"Canadian Application Serial No. 2,457,176, Office Action mailed Sep. 13, 2010", 4 pgs.
"Canadian Application Serial No. 2,457,176, Office Action mailed Dec. 17, 2008", 3 pgs.
"Canadian Application Serial No. 2,457,176, Response filed Mar. 10, 2011 to Office Action mailed Sep. 13, 2010", 22 pgs.
"Canadian Application Serial No. 2,457,176, Response filed Jun. 17, 2009 to Office Action mailed Dec. 17, 2008", 23 pgs.
"European Application Serial No. 04251012.3, European Search Report mailed Sep. 13, 2007", 3 pgs.
"European Application Serial No. 04251012.3, Noting of Loss of Right mailed Oct. 8, 2012", 1 pg.
"European Application Serial No. 04251012.3, Response filed Feb. 19, 2009 to European Search Report mailed Sep. 13, 2007", 17 pgs.
"European Application Serial No. 06759886.2, Communication Pursuant to Article 94(3) EPC mailed Apr. 24, 2009", 6 pgs.
"European Application Serial No. 06759886.2, Communication Pursuant to Article 94 EPC mailed May 29, 2008", 4 pgs.
"European Application Serial No. 06759886.2, Decision to refuse a European Patent application mailed Feb. 3, 2011", 15 pgs.
"European Application Serial No. 06759886.2, Grounds of Appeal filed Jun. 3, 2011", 9 pgs.
"European Application Serial No. 06759886.2, Noting of loss of Rights mailed Jan. 30, 2013", 1 pg.
"European Application Serial No. 06759886.2, Provision of the minutes in accordance with Rule 124(4) EPC mailed Feb. 1, 2011", 5 pgs.
"European Application Serial No. 06759886.2, Response filed Jul. 29, 2009 to Communication Pursuant to Article 94(3) EPC mailed Apr. 24, 2009", 14 pgs.
"European Application Serial No. 06759886.2, Response filed Oct. 7, 2008 to Communication Pursuant to Article 94(3) EPC mailed May 29, 2008", 9 pgs.
"European Application Serial No. 06759886.2, Response filed Dec. 8, 2010 to Summons to attend oral proceedings pursuant to Rule 115(1) EPC mailed Aug. 30, 2010", 14 pgs.
"European Application Serial No. 06759886.2, Result of consultation mailed Jan. 13, 2011", 3 pgs.
"European Application Serial No. 06759886.2, Summons to attend oral proceedings pursuant to Rule 115(1) EPC mailed Aug. 30, 2010", 8 pgs.
"International Application Serial No. PCT/US2006/018823, International Preliminary Report on Patentability mailed Nov. 20, 2007", 7 pgs.
"International Application Serial No. PCT/US2006/018823, Written Opinion mailed Sep. 25, 2006", 6 pgs.
"Iron Port Web Reputation White Paper", A Comprehensive, Proactive Approach to Web-Based Threats, Ironport Systems, (2009), 10 pgs.
"Japanese Application Serial No. 2004-072956, Amendment filed Jul. 25, 2011", with machine translation, 8 pgs.
"Japanese Application Serial No. 2004-072956, Appeal Decision mailed Jul. 10, 2012", with English translation, 4 pgs.
"Japanese Application Serial No. 2004-072956, Decision on Rejection mailed Jun. 9, 2010", (English Translation), 6 pgs.
"Japanese Application Serial No. 2004-072956, Office Action mailed Mar. 21, 2012", with English translation of claims, 4 pgs.
"Japanese Application Serial No. 2004-072956, Office Action mailed Apr. 26, 2011", in English, 3 pgs.
"Japanese Application Serial No. 2004-072956, Office Action mailed Jul. 1, 2009", with English translation of claims, 14 pgs.
"Japanese Application Serial No. 2004-072956, Office Action mailed Aug. 27, 2008", (English Translation), 26 pgs.
"Japanese Application Serial No. 2004-072956, Response filed Feb. 27, 2009 to Office Action mailed Aug. 27, 2008", with English translation of claims, 46 pgs.
"Japanese Application Serial No. 2004-072956, Response filed Jun. 20, 2012 to Office Action mailed Mar. 21, 2012", with English translation of claims, 9 pgs.
"Japanese Application Serial No. 2004-072956, Response filed Oct. 12, 2010 to Decision on Rejection mailed Jun. 9, 2010", with English translation of claims, 17 pgs.
"Japanese Application Serial No. 2004-072956, Response filed Nov. 25, 2010", with English translation of claims, 32 pgs.
"Japanese Application Serial No. 2004-072956, Response filed Nov. 30, 2009 to Office Action mailed Jul. 1, 2009", with English translation of claims, 32 pgs.
"Japanese Application Serial No. 2008-512422, Decision of Final Rejection mailed Oct. 11, 2011", in English, 3 pgs.
"Japanese Application Serial No. 2008-512422, Office Action mailed Jul. 5, 2011", in English, 5 pgs.
Russell, D, et al., "Computer Security Basics", O'Reilly & Associates, Inc., Sebastopol, CA, USA, (1991), 128-132.
Shigechika, Aikawa, "Q & A Collection, DOS/V Power Report", vol. 8 No. 5, (May 1, 1998), 358-361.
Taketatsu, "Open-Weight Division NT-LAN Lecture Search for an Ideal Work Environment the 3rd", INTEROP, Japan, SOFTBANK Inc. the 9th volume, (Sep. 1, 1999), 174-179.
U.S. Appl. No. 10/390,547, filed Mar. 14, 2003, System and Method of Monitoring and Controlling Application Files.
U.S. Appl. No. 11/143,006, filed Jun. 1, 2005, System and Method of Monitoring and Controlling Application Files.
U.S. Appl. No. 11/146,318, filed Jun. 1, 2005, System and Method of Monitoring and Controlling Application Files.
U.S. Appl. No. 13/230,661, filed Sep. 12, 2011, System and Method of Monitoring and Controlling Application Files.
U.S. Appl. No. 14/076,940, filed Nov. 11, 2013, System and Method of Monitoring and Controlling Application Files.
U.S. Appl. No. 11/624,635, filed Jan. 18, 2007, System and Method of Monitoring and Controlling Application Files.
U.S. Appl. No. 11/134,815, filed May 19, 2005, System and Method of Monitoring and Controlling Application Files.
U.S. Appl. No. 15/150,308, filed May 9, 2016, System and Method of Monitoring and Controlling Application Files.
U.S. Appl. No. 12/403,313, filed Mar. 12, 2009, System and Method of Monitoring and Controlling Application Files.
U.S. Appl. No. 13/437,885, filed Apr. 2, 2012, System and Method of Monitoring and Controlling Application Files.
U.S. Appl. No. 14/172,803, filed Feb. 4, 2014, System and Method of Monitoring and Controlling Application Files.

* cited by examiner

*FIG. 4A*

| Parent group | Category | Security VC | Liability VC | Productivity VC |
|---|---|---|---|---|
| System | | | | |
| | Operating Systems | | | |
| | Device Drivers | | | |
| | File Management | | | |
| | Installers | | | |
| | Miscellaneous Utilities | | | |
| Access/Privacy | | | | |
| | Anti-virus Software | | | |
| | Authentication | | | |
| | Encryption | | | |
| | Firewalls | | | |
| | Hacking | X | X | |
| | Remote Access | | | |
| | Spyware | X | | |
| | System Audit | | | |
| Productivity | | | | |
| | Contact Managers | | | |
| | CRM | | | |
| | Data Warehouse, Analytics, Reporting | | | |
| | Database | | | |
| | Document Viewers | | | |
| | ERP/SCM | | | |
| | Graphics | | | |
| | Infrastructure | | | |
| | Presentation | | | |
| | Project Managers | | | |
| | Proprietary | | | |
| | Reference | | | |
| | Search/Retrieval/Knowledge Management | | | |
| | Software Development | | | |
| | Spreadsheets | | | |
| | Suite/integrated | | | |
| | Web/Desktop Publishing | | | |
| | Word Processing | | | |
| Communication | | | | |
| | Collaboration | | | |
| | Dedicated Browsers | | | X |
| | Email | | | |
| | Instant Messaging | | | |
| | P2P Filesharing | | X | |
| | Telephone/Conference/Fax | | | |
| | Web Browser | | | |
| Audio/Video | | | | |
| | Media Players | | | X |
| | Imaging | | | X |
| Entertainment | | | | |
| | Adult | | X | |
| | Gambling | | X | |
| | Games | | | X |
| Malware | | | | |
| | Malicious Applets and Scripts | | | |

```
<NET_ACTIVITY_INFO masked_hash="aafd61a161ae747844bf128d1b61747a954472570" transport="TCP"
port="80" ip="207.46.248.112" />
<NET_ACTIVITY_INFO masked_hash="473c07b881a1dc164206b95e61b8df20080d787c" transport="TCP"
port="80" ip="207.46.250.222" />
<NET_ACTIVITY_INFO masked_hash="473c07b881a1dc164206b95e61b8df20080d787c" transport="TCP"
port="443" ip="209.98.208.1" />
<NET_ACTIVITY_INFO masked_hash="c5e40cd2ee6c99a078e9b35e3a778f35d117c1ac" transport="UDP"
port="34047" ip="96.11.172.240" />
<NET_ACTIVITY_INFO masked_hash="4083b909153e7c1a2d38a39c08fc3912062b7196" transport="UDP"
port="2967" ip="128.0.0.109" />
<NET_ACTIVITY_INFO masked_hash="c5e40cd2ee6c99a078e9b35e3a778f35d117c1ac" transport="UDP"
port="7553" ip="96.219.68.240" />
```

SYSTEM AND METHOD OF MONITORING AND CONTROLLING APPLICATION FILES

RELATED CASES

This application is a continuation of application Ser. No. 14/172,803, filed on Feb. 4, 2014, U.S. Pat. No. 9,253,060, entitled SYSTEM AND METHOD OF MONITORING AND CONTROLLING APPLICATION FILES, which is a continuation of application Ser. No. 13/437,885, filed on Apr. 2, 2012, now U.S. Pat. No. 8,645,340, entitled SYSTEM AND METHOD OF MONITORING AND CONTROLLING APPLICATION FILES, which is a continuation of application Ser. No. 12/403,313, filed on Mar. 12, 2009, now U.S. Pat. No. 8,150,817, entitled SYSTEM AND METHOD OF MONITORING AND CONTROLLING APPLICATION FILES, which is divisional of application Ser. No. 11/134,815, filed on May 19, 2005, now U.S. Pat. No. 7,529,754 B2, entitled SYSTEM AND METHOD OF MONITORING AND CONTROLLING APPLICATION FILES, which is a continuation-in-part of application Ser. No. 10/390,547, filed Mar. 14, 2003, issued as U.S. Pat. No. 7,185,015 B2, all of which are hereby expressly incorporated by reference in their entireties.

BACKGROUND

Field of the Invention

The invention is related to computing devices and, more particularly to monitoring and controlling application files operating thereon.

Description of the Related Art

The Internet is a global system of computers that are linked together so that the various computers can communicate seamlessly with one another. Employees can access server computers to download and execute rogue programs and also operate peer-to-peer file sharing in the workplace, both of which pose new threats to an employer. For example, instant messaging (IM) can pose a security risk to an employer's company since many IM systems allow file transfer among computers. Because the employees can activate IM themselves, the employer does not know who sees sensitive data transmitted between the computers. However, IM can be a productive tool, when used in accordance with company policy. In addition, streaming media is a growing concern because of its drain on network bandwidth. Finally, employees that have illegal or unlicensed software on their workstations can present undesirable liability risks to the company because the company can be held responsible for the employee's use of the illegal or unlicensed software.

Software is available to manage how employees access the Internet in the workplace, preserving employee productivity, conserving network bandwidth and storage costs, limiting legal liabilities and improving network security. However, with the growth of the new threats described above, employers need new solutions to manage the broader intersection of employees with their computing environments.

SUMMARY

The systems and methods of the invention have several features, no single one of which is solely responsible for its desirable attributes. Without limiting the scope of the invention as expressed by the claims which follow, its more prominent features will now be discussed briefly. After considering this discussion, and particularly after reading the section entitled "Detailed Description of the Invention" one will understand how the features of the system and methods provide several advantages over traditional filter systems.

One aspect is a system for collecting network access data for use in updating a monitoring system which controls programs accessing a network. The system comprises a workstation configured such that a program resident thereon can access a network, a workstation management module coupled to the workstation and configured to detect the program accessing the network, determine whether the program is in a network access database, send program data associated with the program to an application server module if the program is not in the network access database, and apply one or more policies that are associated with the program, wherein the one or more policies are received from the application server module, and an application server module coupled to the workstation and configured to receive the program data from the workstation management module if the program was not in the network access database, determine whether the program is operating in a predetermined manner, if the program is not operating in a predetermined manner, then send the program data to an application database factory, if the program is operating in a predetermined manner, then provide the one or more policies associated with the program to the workstation management module.

Another aspect is a method of updating a system which controls operation of programs on a workstation. The method comprises detecting a network access attempt by an application, generating an application digest for the application, determining whether the application is associated with one or more policies, if the application is associated with one or more policies, then applying the one or more policies that are associated with the application, and if the application is not associated with one or more policies, then posting the application to a logging database. The method further comprises uploading the logging database to an application server module, determining whether the application is in an application inventory database, wherein the application is associated with one or more policies, and if the application is not in the application inventory database of the application server module, then posting the application to a network access database, if the application is in the application inventory database, then applying one or more policies associated with the application.

Yet another aspect is a method of collecting collection data for use in updating a system which controls network access of programs. The method comprises detecting access request to a network by a program, determining whether the program is stored in a table, if the program is stored, applying a first rule that is associated with the program, and if the program is not stored, posting the program to a database.

Still, another aspect is a method of updating a system which controls network access by programs on a workstation. The method comprises detecting a network access request of an application, generating a hash value for the application, wherein the hash values includes network access data, comparing the generated hash value to one or more hash values in a hash/policy table that includes one or more policies associated with the one or more hash values, if the generated hash value matches one or more of the hash values in the hash/policy table, then applying the one or more policies that are associated with the one or more hash values, and if the generated hash value does not match one or more hash values in the hash/policy table, then posting the application to a logging database. The method further comprises uploading the logging database to an application server module, determining whether the application from the logging database is in an application inventory database, and if the application is not in the application inventory database, then posting the application to a network access database.

BRIEF DESCRIPTION OF THE DRAWINGS

FIG. 4A is an illustration of a database of parent groups and categories that can be associated with an application file.

FIG. 4B is an illustration of network access data that can be associated with an application file.

FIG. 6 is an illustration of a screen shot of one embodiment of a graphical user interface (GUI) for an application analyst's classification module.

DETAILED DESCRIPTION OF THE INVENTION

The following detailed description is directed to certain specific embodiments of the invention. However, the invention can be embodied in a multitude of different systems and methods. In this description, reference is made to the drawings wherein like parts are designated with like numerals throughout.

In connection with the following description, many of the components of the various systems which may be included in the entire system, some of which are referred to as modules, can be implemented as software, firmware or a hardware component, such as a field programmable gate array (FPGA) or application specific integrated circuit (ASIC), which performs certain tasks. Such components or modules may be advantageously configured to reside on the addressable storage medium and configured to execute on one or more processors. Thus, a module may include, by way of example, components such as software components, object oriented software components, class components and task components, processes, functions, attributes, procedures, subroutines, segments of program code, drivers, firmware, microcode, circuitry, data, databases, data structures, tables, arrays and variables. The functionality provided for in the components and modules may be combined into fewer components and modules or further separated into additional components and modules. Additionally, the components and modules may advantageously be implemented to execute on one or more computers.

Figure 1:
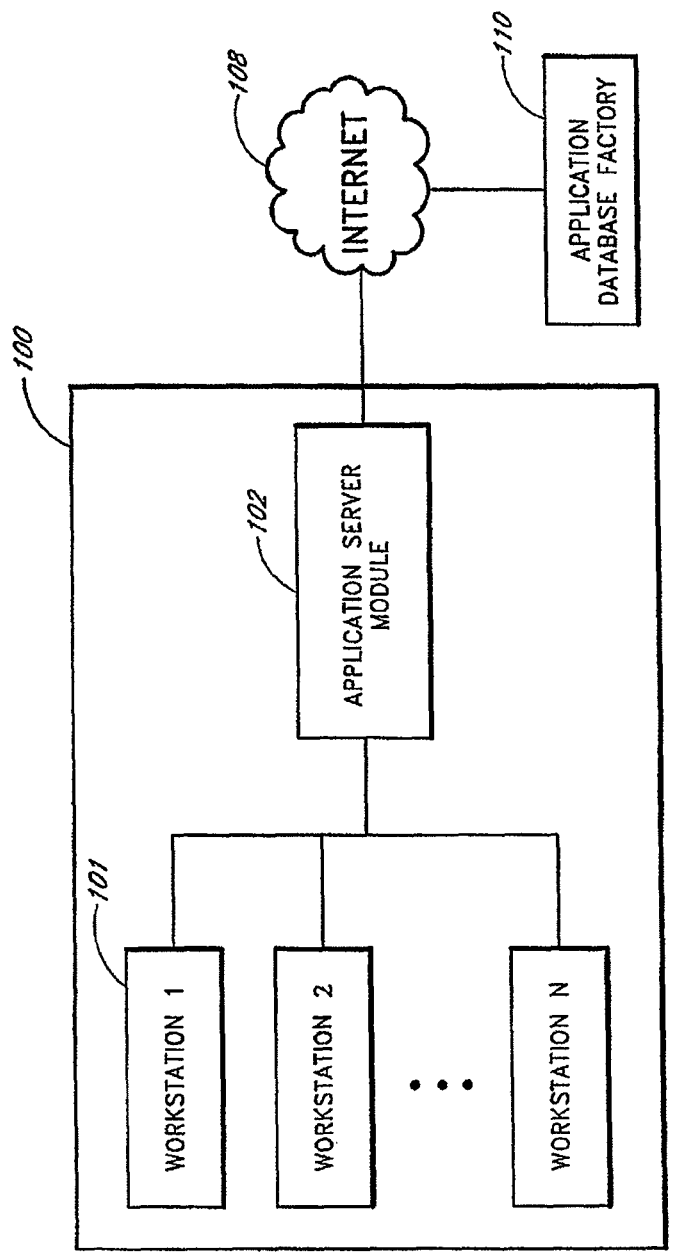
FIG. 1 is a block diagram of a site collection system for controlling application files on a workstation.

FIG. 1 is a block diagram of a local area network (LAN) 100 coupled to an Internet 108 and an application database factory 110, which is also coupled to the Internet 108. For ease of explanation, only a single LAN is shown, though two or numerous such networks would more typically be included. Similarly, two or more application database factories could also be deployed.

The LAN 100 includes one or more workstations 101 coupled to an application server module 102. The application server module 102 communicates via the Internet 108 in order to upload and download applications and application related data with the application database factory 110. The LAN 100 can have an Ethernet 10-base T topology, or be based on any networking protocol, including wireless networks, token ring network and the like.

The workstation 101 is coupled to the application server module 102. The workstation 101 can be a personal computer operating, for example, under the Microsoft Windows operating system, however, other computers, such as those manufactured by Apple or other systems, can be used.

The application server module 102 couples the LAN 100 with the Internet 108. The application server module 102 communicates with the Internet 108 via connection devices, such as routers or other data packet switching technology, for translating Internet TCP/IP protocols into the proper protocols for communicating with the Internet 108. The connection devices used to implement a given system can vary as well as its location within the LAN 100. For example, the connection devices could be located at the workstation(s) 101 or connected peripherally to the Internet 108. An exemplary connection device includes a firewall module (not shown) coupled to a router module (not shown).

Figure 2:
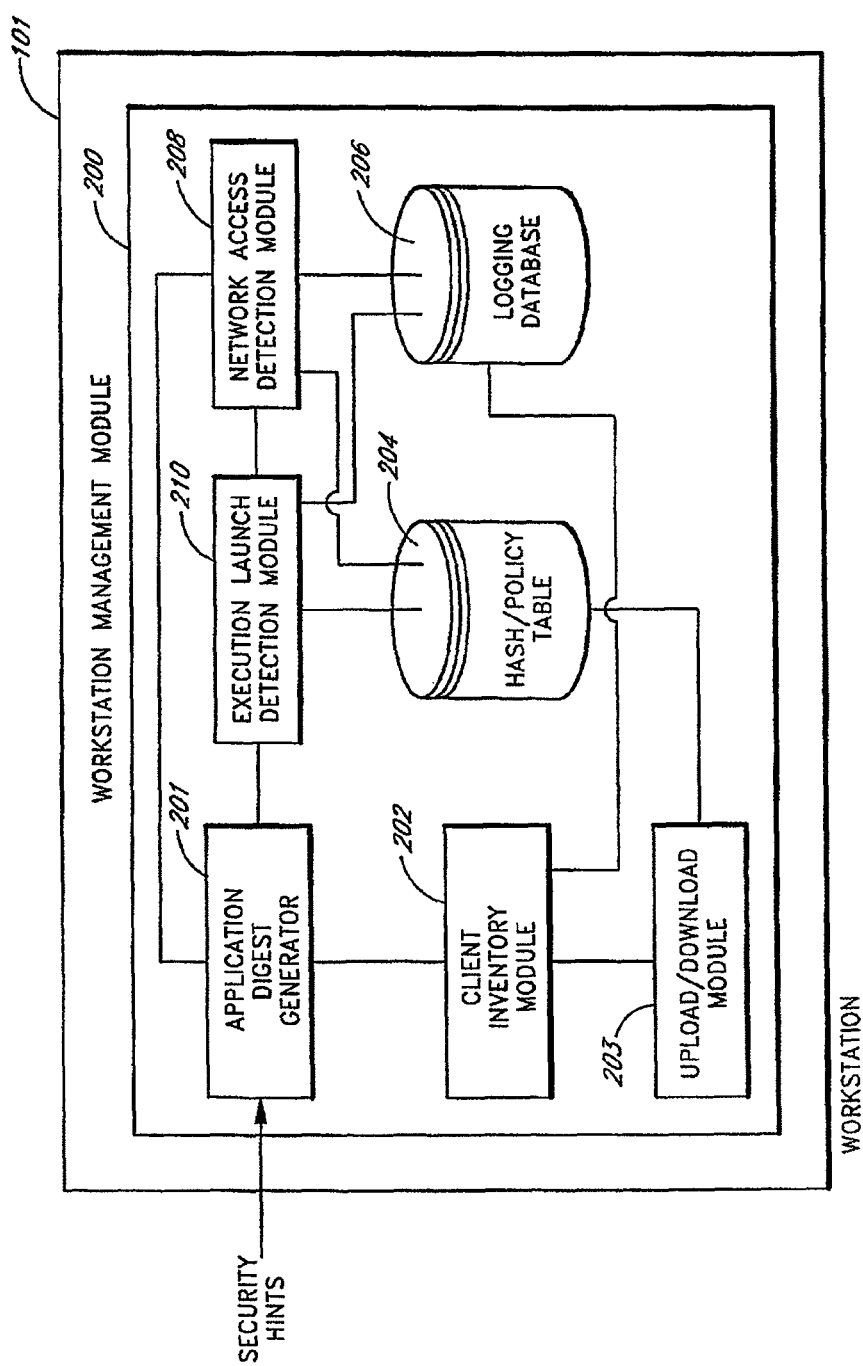
FIG. 2 is a block diagram of a work station management module.

FIG. 2 is a block diagram of the workstation management module 200 from the workstation 101 in FIG. 1. The workstation management module 200 can include an application digest generator 201, a client inventory module 202, an upload/download module 203, a hash/policy table 204, a logging database 206, a network access detection module 208, and an execution launch detection module 210.

The workstation management module 200 can detect the launch of an application on the workstation 101 and determines an access privileges for the workstation 101 and/or user. For example, an access privilege can include allowing the launched application to run on the workstation 101. Access privileges can be in the form of one or more policies or rules. To determine an access privilege for the workstation 101 and/or user, the workstation management module 200 can utilize a predetermined association between the launched application and one or more categories. The one or more categories can be further associated with the access privileges/policies or rules for the workstation 101 and/or user. Alternatively, the launched application is directly associated with an access privilege.

In addition to or in the alternative of detecting the launch of an application and determining whether to allow the application to run on the workstation 101, the workstation management module 200 can monitor the ongoing network activity or behavior of the application. After the application is allowed to run on the workstation 101, the application may or may not access the network. The workstation management module 200 monitors the ongoing behavior of the application even after the workstation management module 200 determines an access privilege for the application to run on the workstation. For example, each time an application that the workstation management module 200 has allowed to run on the workstation 101 attempts to accesses a network, the workstation management module 200 determines whether to allow the application to access the network. In this way, the workstation management module 200 can keep or change a previous access privilege based on the subsequent activity of the application. The access privilege relating to the determination of the workstation management module 200, as to whether to allow an application to launch on the workstation 101, can be stored with or separately from the access privilege that relates to the determination of the workstation management module 200 to allow the application to access the network.

In response to the application attempting to access the network, the workstation management module 101 can select a unique access privilege for the workstation 101 and/or user. The access privilege may be unique to every workstation or to multiple workstations. For example, the access privilege can include allowing the application to access the network or disallowing access to the network from one or more workstations. Access privileges can be in the form of one or more policies or rules.

To determine the access privilege for the workstation 101 and/or user, the workstation management module 101 can utilize a predetermined association between the application and an expected network behavior or activity for the application. This predetermined association is based upon prior or contemporaneous network activity for the application. For example, the expected network activity for an application running on a first workstation 101 can be determined from a record of that application's prior activity on the first workstation. In addition or in the alternative, the expected network activity for an application is determined from a record of that application's prior activity on multiple workstations.

The expected network activity can be determined from network activity by a different but related application. For example, the programs or applications from a single software company may have common access privileges. The access privilege associated with a later version of an application may share common access privileges with an earlier version of the same application.

The network activity of the same application running on different workstations can be weighted in a predetermined manner to determine an expected network activity for the application. The expected network activity can determine a common access privilege for multiple workstations. The workstation management module stores the expected network activity in the hash/policy table 204. In a preferred embodiment, the network activity from multiple workstations is uploaded to the application database factory 110. The access privilege can be determined at the application database factory 110.

The expected network activity for a given application can include one or more network attributes that are associated with the application. The attributes are associated with the application when the application accesses the network in an expected manner. These attributes can include, for example, a specific protocol, a specific I. P. address, and a specific access port. For example, the specific protocol for an application is listed in the hash/policy table 204. If the application requests access to the network using a different protocol than the expected protocol listed in the hash/policy table 204, the network access detection module 208 may disallow access.

An application may request access to the network multiple times in a single day. However, one or more of the network attributes associated with the application may be different for each attempted access. In this way, the attributes of the application may change over time. The network detection access module 208 may allow a first combination of one or more network attributes while disallowing a second combination of the one or more network attributes.

Each combination of the one or more attributes can be associated with one or more categories. The one or more categories can be further associated with the policies or rules for the workstation 101 and/or user.

When a program or application on a computer or workstation is launched, the execution launch detection module 210 detects the launch. In response to this detection, the workstation management module 200 determines whether to allow or disallow the application to run on the workstation 101.

An application that the workstation management module 200 allows to run on the workstation 101 may or may not request access to a network. For an application that does request access to a network, the application may request access at launch or after the program is running on the workstation 101. For example, once a publisher's application is launched, the application may request access over a network to that publisher's website for updates. Continuing with this example, the hash associated with the application and the combination of one or more network attributes associated with the network access request are compared to the hash/policy table 204 to select a policy or rule. The hash/policy table 204 can further include categories. A category can then be associated with the policy or rules.

When an application or program accesses a network, the network access detection module 108 monitors the behavior or activity of the application or program. The launch detection module 210 and the network access detection module 108 direct the application digest generator 201 to analyze data related to a requested application or data related to a network accessing application. As part of its analysis, the execution launch detection module 210 can generate a hash for the application using the application digest generator 201. The application digest generator 201 parses properties from the requested application to uniquely identify the application. These properties can include network access data. Exemplary properties include the name, publisher, suite, hash, file size, version, protocol, I.P. address, port, and additional information or properties which are associated with a launched or network accessing application.

The hash for the application is determined by transforming the binary associated with the application into a unique set of bits. A hash function, which is a form of encryption known in the art, is employed in determining the hash for the application. In this way, the hash function takes selected binary input from the application and transforms the binary into a fixed-length encrypted output called a hash. The result is a hash with a fixed-size set of bits that serves as a unique "digital fingerprint" for the application. Two exemplary hash algorithms include MD-5 and Secure Hash Algorithm-1 (SHA-1). The MD-5 hash algorithm produces a 128-bit output hash. The SHA-1 algorithm produces a 160-bit output hash.

The parsed properties or attributes are provided to the execution launch detection module 210 and/or the network access detection module 208. For launched applications, the execution launch detection module 210 analyzes the application request from the workstation 101 and then compares the application request with the hash/policy table 204. For applications requesting to access a network, the network access detection module 208 analyzes the network access request from the workstation 101 and then compares the network access request with the hash/policy table 204. The hash/policy table 204 includes one or more predetermined network attributes and one or more policies associated therewith. As will be explained with reference to FIG. 3, the application server module 102 provides the hash/policy table 204 to the workstation management module 200.

The hash/policy table 204 is received from the application server module 102. The hash/policy table 204 can include a list of application names, publishers, suites, hashes, ports, protocols, I.P. addresses, categories, and rules or policies associated therewith. In one embodiment, the one or more parsed properties in the hash/policy table 204 include a list of hash values. Continuing with this embodiment, the hash/policy table 204 further includes a list of policies that are associated with the hash values in the list. In addition to hash values and policies in this embodiment, the hash/policy table 204 could further include a list of categories that are associated with the hash values and/or policies. Moreover, in another embodiment, the hash/policy table 204 does not include hash values. Instead, the hash/policy table 204 includes the names/publishers/suites or other properties which identify the applications in the hash/policy table 204. In still another embodiment, the hash/policy table 204 includes the port/I.P. address/protocol or other properties which identify the applications in the hash/policy table 204.

Once the application is requested to run on the workstation or when the application requests to access the network, the policy from the hash/policy table 204 which corresponds to that application is also identified. The execution launch detection module 210 or the network access detection module 208 compares the properties of the application to the properties in the hash/policy table 204 to determine what access privileges or policies should be applied to the request to run the application or to access the network. These policies or rules can include, for example, allowing execution of the program, allowing access to the network, denying execution of the program, denying access to the network, alerting the user that the request to run the application will be logged, alerting the user that the request to access the network will be logged, allowing the user a specific amount of time in which to run the application, and allowing the user a specific amount of time in which to access the network.

In addition to the policies and rules listed above, the workstation management module 200 can employ other actions, cumulatively referred to as selectable filters, in response to a request to run the application or to a request for an application to access a network. Examples of selectable filters include postponing the running of the application, postponing access to the network, allowing the user to override denial to run the application, allowing the user to override denial to access the network, limiting the user's access to the application based on a quota, limiting the user's access to the network based on a quota, limiting the user's access to the application based on a network load, and limiting the user's access to the network based on a network load. Each requested application or network accessing application can be associated with one or more policies or rules.

In one embodiment, the execution launch module 210 or the network access detection module 208 checks to see if the generated hash matches any hashes stored in the hash/policy table 204. If a match between the requested application and a hash in the hash/policy table 204 is found, the execution launch detection module 210 or the network access detection module 208 applies the policy(s)/rule(s) associated with the hash that matches the application and/or the user requesting the application or network access. For example, if application of the rule by the execution launch detection module 210 indicates that the requested application is not allowed to run on the workstation 101 or to be run by the user, a predefined block page can be sent to the user interface explaining that the requested application is not allowed to run and why. Alternatively, the execution launch detection module 210 simply stops the requested application from running on the workstation 101.

For example, if application of the rule by the network access detection module 208 indicates that the network access requested by the application is not allowed, a predefined block page can be sent to the user interface explaining that the requested application is not allowed to access the network and why. Alternatively, the network access detection module 208 simply stops the requested application from accessing the network.

If the execution launch detection module 210 or the network access detection module 208 does not find the application hash in the hash/policy table 204 (for example, the application is uncategorized or the application is behaving unexpectedly), the module 208, 210 then determines how to proceed with the application. For example, running of the application could be allowed when the execution launch detection module 210 or the network access detection module 208 determines that the application requested is uncategorized or behaving unexpectedly. Alternatively, the execution launch detection module 210 or the network access detection module 208 can stop execution or network access for the application depending on a policy associated with the user at this workstation.

The one or more policies identified for the requested application is applied in response to the request to run the application. In this way, the execution launch detection module 210 or the network access detection module 208 filters each request to run an application using the parsed properties, the hash/policy table 204, and the policies/rules from the hash/policy table. A policy can be provided and utilized even if the application is not found in the hash/policy table 204.

If the requested application is found in the hash/policy table 204, the event is logged in the logging database 206. Information that is logged in the logging database 206 can include, for example, the application name, time of day, port, I.P. address, protocol, and the hash associated with the application. The logging database 206 can also include additional data associated with the application. For example, a request frequency or a time of execution for the application requested can be included in the logging database 206.

If the hash of the uncategorized application is not represented in the logging database 206, the execution launch detection module 210 can store the application name, hash, and information parsed by the application digest generator 201 in the logging database 206. In this way, the logging database 206 can include additional information associated with the requested application. For example, the publisher, suite, file size, hash, protocol, I.P. address, port, directory location, and the like can be included in the logging database 206.

Still referring to FIG. 2, in one embodiment, the client inventory module 202 is configured to inventory the applications on the workstation 101. To that end, the client inventory module 202 can access the hash/policy table 204 to determine whether the applications on the workstation 101 are classified and/or uncategorized. The client inventory module 202 can be configured to perform the inventory of the workstation 101 on a periodic basis. For example, the client inventory module 202 can inventory the applications on the workstation 101 once a day or on any other interval selected. Advantageously, the client inventory module 202 can perform the inventory during non-working hours. The inventory can be determined when the workstation 101 is powered up by the user or powered down by the user. Depending on the configuration of the LAN 100, a network administrator can instruct the client inventory module 202 to perform the inventory. In addition, the inventory can be performed in response to polling by the application server module 102 (see FIG. 1).

Still referring to FIG. 2, the upload/download module 203 can transmit data to and receive data from the application server module 102 (see FIG. 1). For example, the upload/download module 203 can transmit data from the logging database 206 to the application server module 102. In an embodiment where the client inventory module 202 performs an inventory of the applications on the workstation 101, the results of the inventory can be uploaded to the application server module 102 by the upload/download module 203.

The upload performed by the upload/download module 203 can be immediate or periodic depending on the desires of the network administrator. For example, a daily upload after normal business hours could be used. The upload/download module 203 can compute the request frequency from scanning the logging database 206, to prioritize the applications in the logging database 206 for their transmission to the application server module 102. In another embodiment, a frequency count database (not shown) is updated for each entry in the logging database 206. The frequency count database maintains the request frequency for each entry in the logging database 206. In this embodiment, the upload/download module 203 accesses the frequency count database to prioritize the applications.

If data from the logging database 206 is to be uploaded to the application server module 102, the upload/download module 203 can refer to a request frequency for applications found from scanning the logging database 206. The request frequency can be used to prioritize the applications in the logging database 206 for their transmission to the application server module 102.

Figure 3:
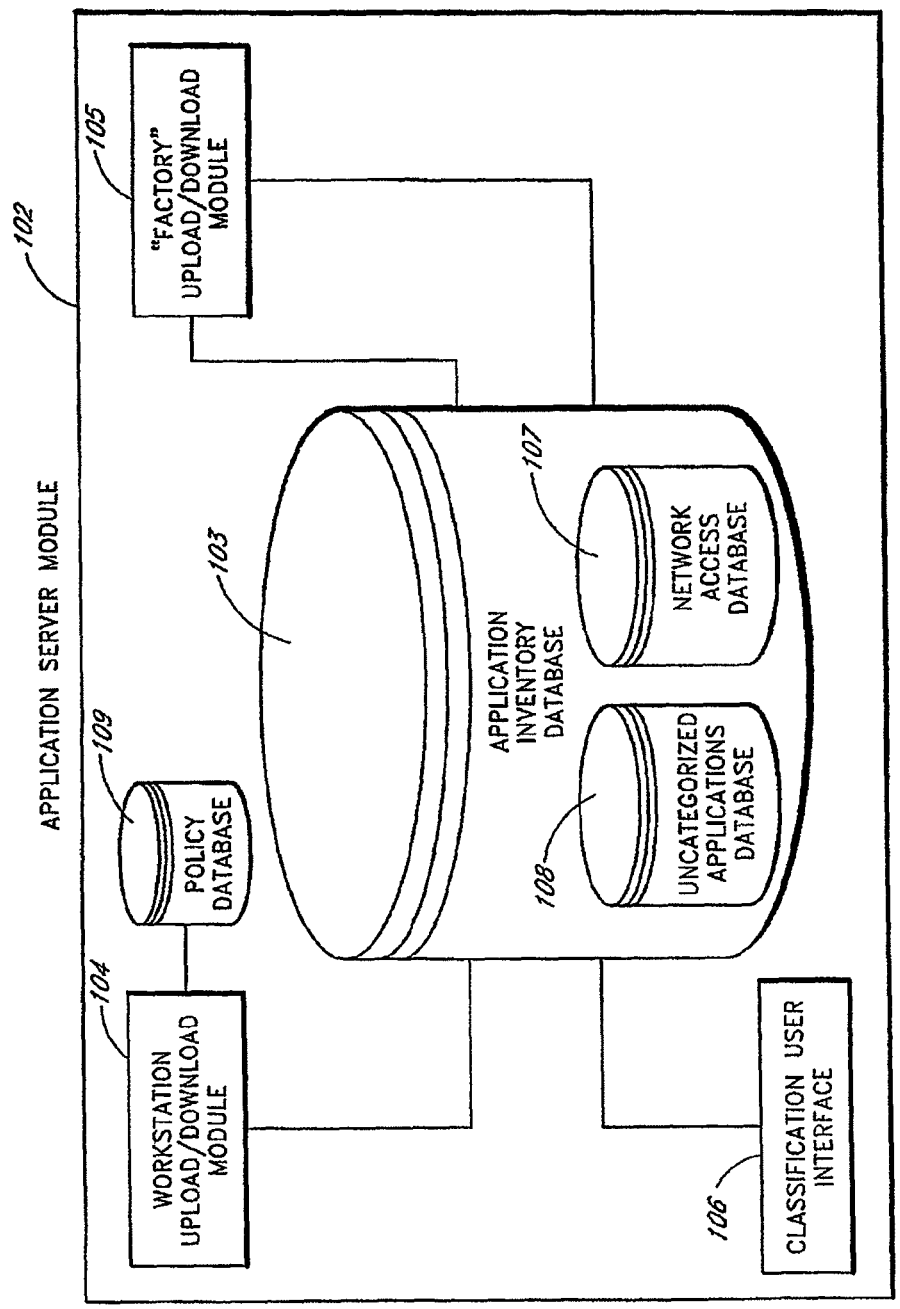
FIG. 3 is a block diagram of an application server module.

FIG. 3 is a block diagram of an application server module 102 which communicates with the workstation management module 200 (FIG. 2) to upload and download a list of applications comprising properties of applications as well as policies associated with the applications once categorized. These properties can include network access data associated with each application. For example, parsed properties from requested applications or network accessing applications can be uploaded to the application server module 102 while a list of hash values and policies associated therewith are downloaded to the workstation management module 200. In addition, the category associated with the application can be transmitted to the workstation management module 200. If the category associated with the application is available to the workstation management module 200, the workstation management module can select the access privilege for the workstation and/or user that corresponds to the one or more categories associated with the application. When more than one category is associated with the application and the categories have different policies associated thereto, one or both rules/policies can be used for the access privilege.

The application server module 102 can include an application inventory database 103, a workstation upload/download module 104, a factory upload/download module 105, a classification user interface 106, and a policy database 109. The application inventory database 103 can further include an uncategorized application database 108 and a network access database 107. Alternatively, the uncategorized application database 108 and/or the network access database 107 are combined into a single database or can be separate databases from the application inventory database 103.

The network access database 107 includes network access data associated with the application. The network access data includes parsed properties or attributes that are associated with the application when the application accesses the network. The network access data is uploaded to the application server module 102. The uploaded network access data can be compared to expected network access data for the application. As explained above, the expected network access data can be a compilation of network access data associated with contemporaneous or prior network access by the application. The expected network access data can be compiled from the requesting workstation or from other workstations.

The expected network access data is derived from network access data obtained when the application is behaving in a predetermined manner. The uploaded network access data allows the application server module 102 to monitor the behavior of categorized and uncategorized applications. The categorized application is monitored each time the application accesses the network. A categorized application that does not operate in a predetermined manner is placed in the uncategorized applications database 108. In this way, the same application may have different entries in the application inventory database 103. For example, a first entry in the application inventory database 103 corresponds to the application hash and parsed properties or features associated with the application when the application is operating in a predetermined manner. These expected features relate to normal network activity by the application. A second entry corresponds to the same application hash but different parsed properties or features associated with the application when the application is not operating in a predetermined manner.

The network administrator, or the like, interfaces with the application server module 102 via the classification user interface 106. The network administrator can classify uncategorized applications and/or recategorize previously categorized applications. The uncategorized applications can include applications that are not categorized and/or applications that are categorized but are not operating in a predetermined or expected manner. In the later case, the network access detection module 208 looks to the network attributes when determining whether the application is operating in a predetermined or expected manner.

The network administrator receives the data from the application inventory database 103 via the classification user interface 106. The network administrator can further interface through the classification user interface 106 to select or create access privileges/policies/rules for users, workstation, and/or groups of users/workstations. These rules are stored in the policy database 109. These rules can include, for example, allowing applications associated with selected categories to execute on a given workstation 101. These rules can also include, for example, allowing the application to access the network from a given workstation 101. Rules can also include selectable filters. For example, rather than simply not allowing the application to execute or to access the network, the network administrator may select or create a selectable filter which is applied when the application is requested to run or access the network. The rules are provided to the workstation management module 200 via the workstation upload/download module 104. In this way, the execution launch detection module 210 and/or the network access detection module 208 (see FIG. 2) apply the rule that is associated with the category or network access data of the application.

One function of the workstation upload/download module 104 is to receive identifiers for the application names and any additional data or parsed properties which are associated with the application names from the workstation management module 200. For example, the identifier for an application name could be a hash value or the name of the application itself. In one embodiment, the application names include names from the logging database 206. The additional data can also include a request frequency for an application found in the logging database 206, the request frequency for an application found in the logging database 206, a trace ID, a primary language used by the workstation management module 200, source IP address, destination IP address, source port number, destination port number and other network access data. For ease of explanation, the term "collection data" will be used to include applications and any additional data associated with the application. Additionally, the workstation upload/download module 104 downloads all or portions of the application inventory database 103 to the workstation management module 200 as will be described more fully below.

The workstation upload/download module 104 receives the collection data from the upload/download module 203 (see FIG. 2) and processes the collection data. Processing can include merging and sorting the collection data from multiple workstation management modules. The workstation upload/download module 104 determines whether each application in the collection data requires categorization. For example, an application that is not operating in a predetermined manner may require categorization.

If an application has not been previously categorized or if the application has been previously categorized but is not operating in a predetermined manner, the collection data associated with that application is stored in the uncategorized application database 108. Thus, an application name which is found in the application inventory database 103 can also be stored in the uncategorized applications database 108 if that application is not operating in a predetermined manner. For applications that are not operating in a predetermined manner, the collection data can be further stored in the network access database 107. As explained above, the network access database 107 can be separate from or combined with the uncategorized applications database 108.

The network administrator receives the collection data (for example, application information and any additional data associated with the application) from the uncategorized application database 108 and/or the network access database 107. The network administrator, via the classification user interface 106, is then able to categorize the uncategorized application and/or associate a policy with the category or application. Applications that the network administrator determines are not operating in a predetermined manner are categorized or re-categorized. The application is re-categorized based on parsed properties or features which are different than the parsed properties or features associated with the original categorization of the application. Once categorized or re-categorized, the application is stored in the application inventory database 103. The application inventory database 103 may include one or more entries for the application when the application is operating in a predetermined manner as well as one or more entries for the same application when the application is not operating in a predetermined manner. As will be described below, if the network administrator does not classify the application, the application database factory 110 can classify the collection data.

Once the application has been classified or categorized by the network administrator, the application and the associated category are posted to the application inventory database 103. The workstation upload/download module 104 thereafter routinely copies the application inventory database 103 or a portion thereof to the workstation management module 200 (see FIG. 2). For example, data from the application inventory database 103 can be copied to the hash/policy table 204. The policies in the policy database 109 can be incorporated into the downloaded data from the application inventory database 103 or downloaded separately from the application inventory database 103. As can be imagined, the system can include thousands of workstation management modules 200, each of which is updated regularly by the workstation upload/download module 104 to provide updated data to the hash/policy table 204. In some embodiments, the workstation upload/download module 104 transfers portions of the application inventory database 103. For example, the workstation management module 200 can receive updates so that the entire database need not be transmitted. In other embodiments, the workstation management module 104 receives a subset of the data from the application inventory database 103. For example, the selected data could be the hash values. The policies from the policy database 109 could then be incorporated with the hash values and downloaded to the workstation management module 104. Flowcharts of the process performed by the application server module 102 are shown in, and will be described with reference to, FIGS. 9 and 16.

Still with reference to FIG. 3, the factory upload/download module 105 is configured to transmit data from the application inventory database 103 to the application database factory 110. The upload could be immediate or periodic depending on the level of service required by the network administrator. For example, a daily upload after normal business hours could be used. The factory upload/download module 105 can refer to request frequency or associated network access data to prioritize the applications in the application inventory database 103 for their transmission to the application database factory 110. The factory upload/download module 105 can refer to the uncategorized application database 108 and/or the network access database 107 to select collection data for uploading to the application database factory 110. If data from the uncategorized application database 108 or the network access database 107 is to be uploaded to the application database factory 110, the factory upload/download module 105 can refer to a request frequency to select applications from the uncategorized application database 108 for uploading to the application database factory 110. In this way, the request frequency can be used to prioritize the applications in the uncategorized application database 108 or the network access database 107 for their transmission to the application database factory 110.

The factory upload/download module 105 can further upload applications that have been classified by the network administrator. As described above, the network administration can classify or categorize applications via the classification user interface 106. In this way, the application database factory 110 receives the newly classified applications from the application server module 102. As can be imagined, the application database factory 110 can receive applications and associated categories from thousands of application server modules 102.

The workstation upload/download module 104 can receive an inventory taken by the client inventory module 202 from the upload/download module 203 (see FIG. 2). Once uploaded to the application server module 102, the network administrator can review one or more inventories to determine what applications are being used by each workstation 101. The network administrator can review one or more inventories to determine whether the categorized application is operating in a predetermined manner. The inventory can include categorized as well as uncategorized applications. Depending on the configuration of the LAN 100, the network administrator can review the one or more inventories at the workstation management module 200 (see FIG. 2).

FIG. 4A is an illustration of one embodiment of a database of parent groups and categories that are associated with the applications. In the illustrated embodiment, one or more of the categories listed in the database are further associated with risk classes. Examples of risk classes include security, liability, and productivity. The risk classes can be useful to the network administrator when associating rules/policies with each application. Moreover, in some embodiments each rule/policy is associated with the applications based on the risk class that is associated with each category.

Still referring to FIG. 4A, exemplary categories of applications include operating systems, anti-virus software, contact managers, collaboration, media players, adult, and malicious applets and scripts. The categories can be further grouped into parent groups. For example, parent groups might include system, access/privacy, productivity, communication, audio/video, entertainment, and malware. For each one of the parent groups and/or categories, the network administrator can select an individual policy or rule to associate therewith. Thus, once the requested application is categorized, the application server module 102 can select the policy or rule that is associated with that category.

FIG. 4B is an illustration of network access data that can be associated with an application file. In the illustrated embodiment, each masked hash values corresponds to an application accessing the network. The parsed properties or features associated with the applications can include a source IP address, destination IP address, source port number, destination port number and other network access data. In FIG. 4B, these parsed properties include the transport protocol, destination port, and destination I.P. address. The application corresponding to the hash "aafd61a161ae747844bf128d1b61747a95472570" employed transport Transmission Control Protocol ("TCP"), port "80", and destination I.P. address 207.46.248.112." User Datagram Protocol ("UDP") is another transport protocol that can be used. The network access data for the application allows the network administrator to discriminate between expected/predetermined behavior and unexpected behavior of the application. Different rules/policies can be applied to multiple entries for the same application depending on the network access data that is associated with each entry.

Figure 5:
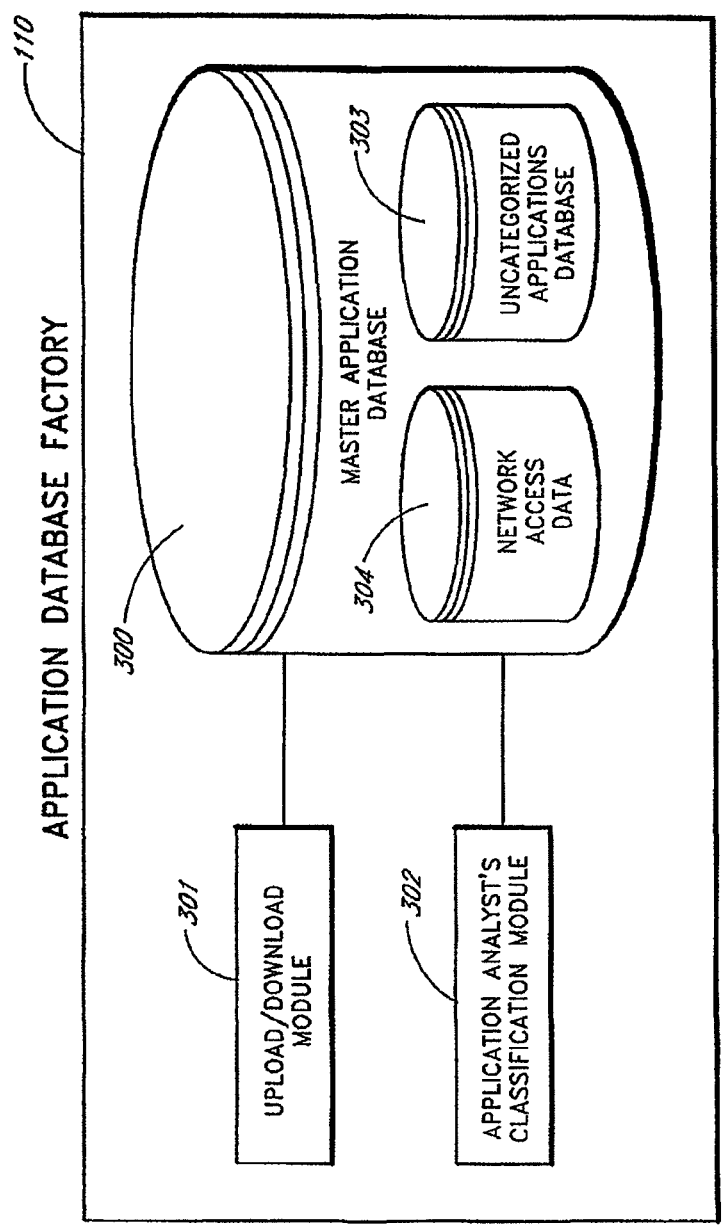
FIG. 5 is a block diagram of an application database factory.

FIG. 5 is a block diagram of the application database factory 110 connected to the Internet 108. The application database factory can be implemented as one or more computers or servers with related data storage. The application database factory 110 provides the application inventory database to the application server module 102 and processes data that is associated with uncategorized applications and other information. Uncategorized applications include applications previously categorized that are not operating in a predetermined manner. The other information may include frequency usage from the application inventory database 103. In one embodiment, the application database factory 110 receives uncategorized applications and any additional data associated with the application from the application server module 102 and downloads categorized applications to the application server module. The application database factory 110 can also upload the request frequency for the applications.

The application database factory 110 can include an upload/download module 301, a master application database 300, and an application analyst's classification module 302. The master application database 300 can further include an uncategorized applications database 303 and/or a network access database 304. Alternatively, the uncategorized applications database 303 and/or the network access database 304 are combined into a single database or can be separate databases from the master application database 300.

One function of the upload/download module 301 is to receive collection data (for example, applications and any additional data associated with the application) from the application server module 102. In one embodiment, the collection data includes applications from the uncategorized application database 108, the network access database 107, and the application inventory database 103. The collection data can include a request frequency for an application found in the application inventory database 103 (see FIG. 3), a request frequency for an application found in the uncategorized application database 108, a trace ID, a destination port number, other network access data, and a primary language used by the application server module 102.

The upload/download module 301 receives the collection data from the factory upload/download module 105. The upload/download module 301 processes the collection data. Processing can include merging, sorting, and determining a language for the collection data from multiple application server modules 102. The upload/download module 301 determines whether each application in the collection data requires categorization. If the application has not been previously categorized or if the application is not operating in a predetermined manner, the application analyst's classification module 302 receives the application and any additional data associated with the application from the upload/download module 301.

The application analyst classification module 302 is coupled to the master application database 300. The application analyst classification module 302 is configured to manipulate and manage data from the master application database 300. The application analyst classification module 302 receives applications and their associated data from the master application database 300. The associated data can include, for example, an IP address, a publisher and suite that correspond to the application.

The application analyst's classification module 302 classifies or categorizes applications which are then added to the master application database 300 of categorized applications. A human reviewer interacts with the application analyst's classification module 302 to perform the categorization or recategorization. The process for classifying or categorizing applications at the application database factory is described with reference to FIGS. 13 and 20.

For a human reviewer, a set of PC-based software tools can enable the human reviewer to manipulate, scrutinize, and otherwise manage the applications from the master application database 300. The human reviewer can interact with the application analyst classification module 302 via a graphical user interface (GUI). In this way, the GUI provides a graphical interface tool for the human reviewer to manipulate and manage the master application database 300. The GUI includes a representation of the application ID and the related textual information. The GUI can include buttons preloaded with algorithmically derived hints to enhance productivity of the human reviewer. These identities can be selected based on, for example, the URL that is identified as the source of the application. An exemplary GUI will be described below with reference to FIG. 6.

The application analyst's classification module 302 is configured to select applications and their associated data from the master application database 300. The application analyst classification module 302 can apply rules to select a subset of applications from the master application database 300. These rules can be dependent upon, for example, categories, languages, suites, dates, and source directories. The application analyst classification module 302 can use SQL queries, in conjunction with the rules, to select the subset for categorization or recategorization from the master application database 300.

The application analyst classification module 302 can analyze each application, the collection data, any text objects associated with the application, any additional data associated with the application, and any additional data retrieved independent of the collection data to determine one or more appropriate categories. Exemplary independent data includes data from an Internet search that utilizes the collection data. Categorization can be based upon word analysis, adaptive learning systems, and image analysis.

In one embodiment, the application analyst classification module 302 accesses the Internet 108 and performs a search based on the application and the collection data. In one embodiment, a GUI button preloaded with the publisher of the application is selected by the human reviewer to initiate an Internet search. The Internet search can provide the application analyst's classification module 302 with additional information for categorizing the application. For example, the search can identify a uniform resource locator (URL) which is the address of a computer or a document on the Internet that is relevant to the categorization process for the application. The URL consists of a communications protocol followed by a colon and two slashes (e.g., http://), the identifier of a computer, and usually a path through a directory to a file. The identifier of the computer can be in the form of a domain name, for example, www.m-w.com, or an Internet protocol (I.P.) address, for example, 123.456.789.1. There are often addresses, components thereof (for example, I.P. address, domain name, and communication protocol), or other location identifiers that can be used to identify computers or documents on the Internet. For ease of description, the term URL is used hereafter in reference to their addresses. The application analyst's classification module 302 can utilize the hash and/or URL associated with the application to aid in categorizing the application.

Figure 13:
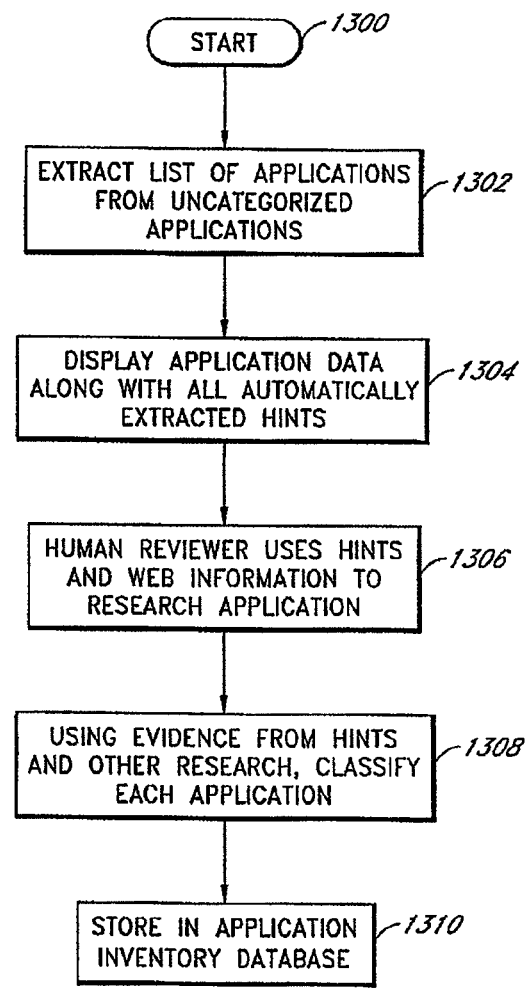
FIG. 13 is a flow diagram illustrating a process for classifying an uncategorized application at the application database factory.
Figure 20:
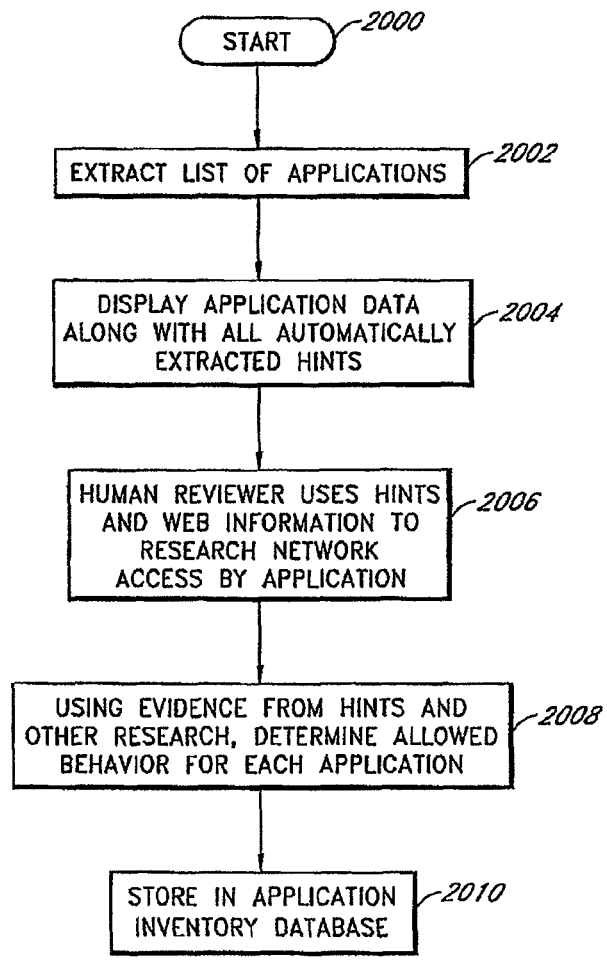
FIG. 20 is a flow diagram illustrating a process for analyzing the network access data associated with an application at the application database factory.

Once categorized, the application analyst classification module 302 posts the application along with its associated one or more categories into the master application database 300 of applications. The master application database of applications can include applications and their associated categories. The master application database 300 can be stored in a relational database management system, such as Oracle, Sybase, Informix, Microsoft Server, and Access. A text object posting system can perform this posting. A more detailed block diagram of the process performed via the application analyst's classification module 302 is shown in FIGS. 13 and 20.

Once the application analyst classification module 302 has posted the application and its associated category or categories into the master application database 300, the upload/download module 301 thereafter routinely copies the master application database 300 to the application server module(s) 102. As can be imagined, the system can include thousands of application server modules 102, each of which is updated regularly by the upload/download module 301 to provide an updated database of categorized applications. Moreover, the upload/download module 301 can transfer portions of the master application database 300, such as updates, to the application server module 102 so that the entire database does not need to be transmitted. A flowchart of the process performed by the application database factory 110 is shown in, and will be described with reference to, FIGS. 11 and 18.

In some embodiments, the application analyst classification module 302 can process the categorized applications selected from the master application database 300 for their subsequent download to the application server module 102.

Figure 6:
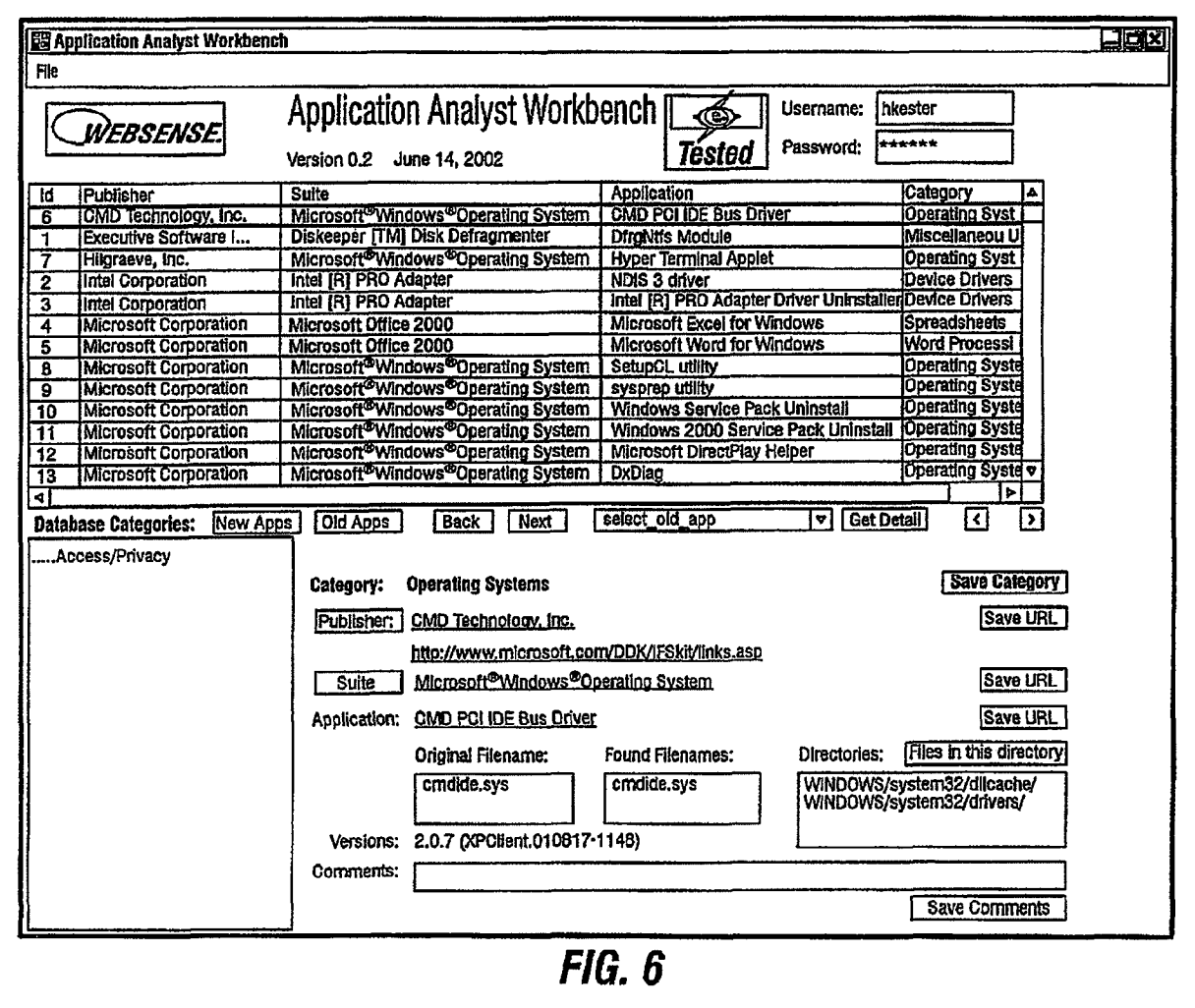

Referring now to FIGS. 5 and 6, a screen shot of one embodiment of a graphical user interface for the application analyst's classification module 302 is shown. In FIG. 6, the highlighted application filename is "cmdide.sys." The name of the application is "CMD PCI IDE Bus Driver." In this example, additional information uploaded to the application database factory 110 includes the publisher CMD Technology, Inc. and the related suite, Microsoft Windows Operating System. The application analyst's classification module 302 displays this information to the human reviewer to aid in categorizing the application.

As shown in FIG. 6, the application, CMD PCI IDE bus driver, was associated with the URL "http://www.microsoft.com//ddk/ifskit/links.asp". In this example, the application analyst's classification module 302 classified the application in the parent group titled access/privacy. The application analyst classification module 302 can perform further categorization of the application. For example, in the parent group titled access/privacy, the application could be classified under anti-virus software, authentication, encryption, firewalls, hacking, remote access, spy ware, or system audit. One or more risk classes can be used to group categories. The risk classes can be useful to the network administrator when associating rules/policies with each application. As mentioned above, one or more categories can be associated with a single application or hash value.

Figure 7:
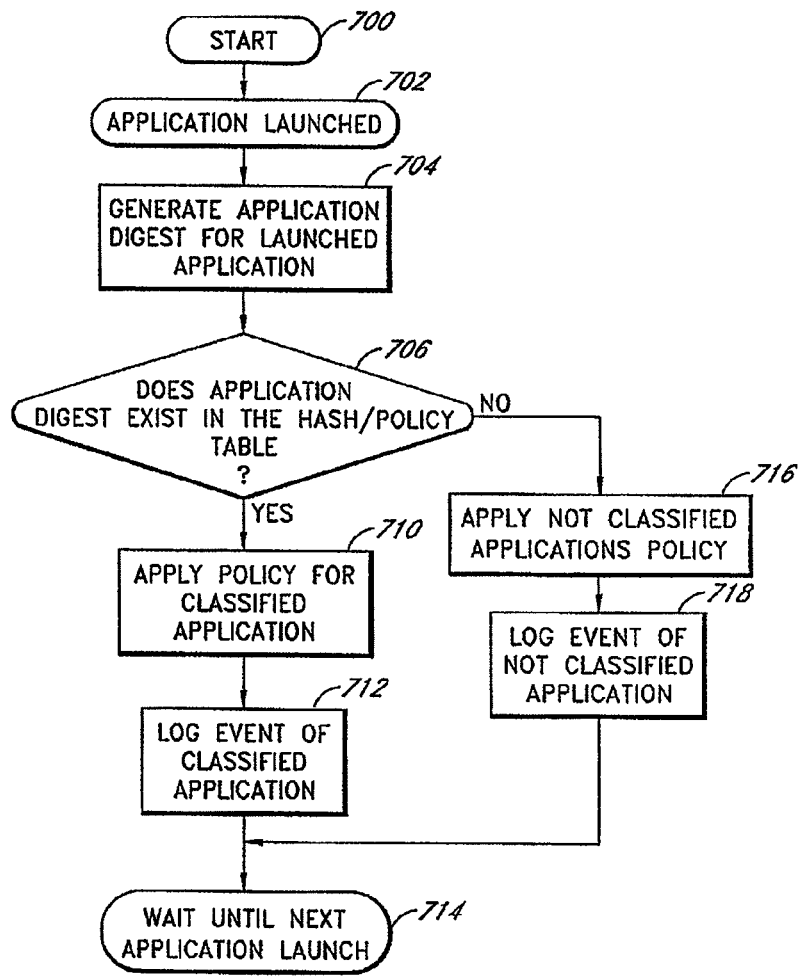
FIG. 7 is a flow diagram illustrating a process for monitoring and controlling the launch of an application on the workstation.

FIG. 7 is a flow diagram illustrating the process of monitoring and controlling the execution of a requested application on the workstation 101. The process begins at a start state 700. Next, at a state 702, the user of the workstation 101 launches an application. The launch of the application can be in response to a predetermined startup sequence for the workstation 101. For example, the workstation 101 could be programmed to launch one or more applications upon power-on startup. The execution launch detection module 210 (see FIG. 2) detects the launch of the application. Next, at a state 704, the application digest generator 201 generates a digest of data relating to the launched application. The digested data can be in the form of collection data. The collection data can include, for example, the publisher, suite, one or more hashes, and source directory.

The process moves to a decision state 706 where the execution launch detection module 210 compares the application digest prepared by the application digest generator 201 to the hash/policy table 204. For example, a hash generated by the application digest generator 201 can be compared to hashes from the hash/policy table 204. In one embodiment, a plurality of different hashes is generated and compared to hashes from the hash/policy table 204. For example, an MD-5 hash and an SHA-1 hash could be generated for the requested application and compared to MD-5 hashes and SHA-1 hashes from the hash/policy table 204.

If the hash corresponds to a hash stored in the hash/policy table 204, the process continues to a state 710 where the policy associated with the hash is applied in response to the launch of the requested application. For example, these policies can include allowing the execution of the application, denying execution of the application, alerting the user that the execution of the application may receive further scrutiny by the network administrator, or allow for a certain amount of time for running the application. In this instance, at the end of the specified time, the execution launch detection module 210 does not permit the application to continue running on the workstation 101. Next, at a state 712, the execution launch detection module 210 logs the event to the logging database 206. In this way, a record is maintained of the applications that are allowed to execute on the workstation 101. The process then moves to a state 714 where the execution launch detection module 210 monitors the system in order to detect the launch of another application on the workstation 101.

The retrieved information from the hash/policy table 204 further includes a policy associated with the hash value. In one embodiment, category information, which corresponds to the hash value, is utilized in selecting the policy. For example, a hash value could be associated with a parent group and/or category. The parent group and/or category could then be associated with the policy.

Returning to the decision state 706, if the application digest does not correspond with an application or hash classified in the hash/policy table 204, flow moves to a state 716 where the execution launch detection module 210 applies a not-classified application policy to the request to execute the application. The not-classified application policy can include, for example, allowing the application to execute, denying execution, or alerting the user that additional scrutiny will be applied to the requesting of the application, while limiting the amount of time that the application is allowed to run on the workstation 101.

Flow moves to a state 718 where the request to execute the application is logged to the logging database 206. The process continues to state 714 as described above where the execution launch detection module 210 awaits the launch of another application on the workstation 101.

Figure 8:
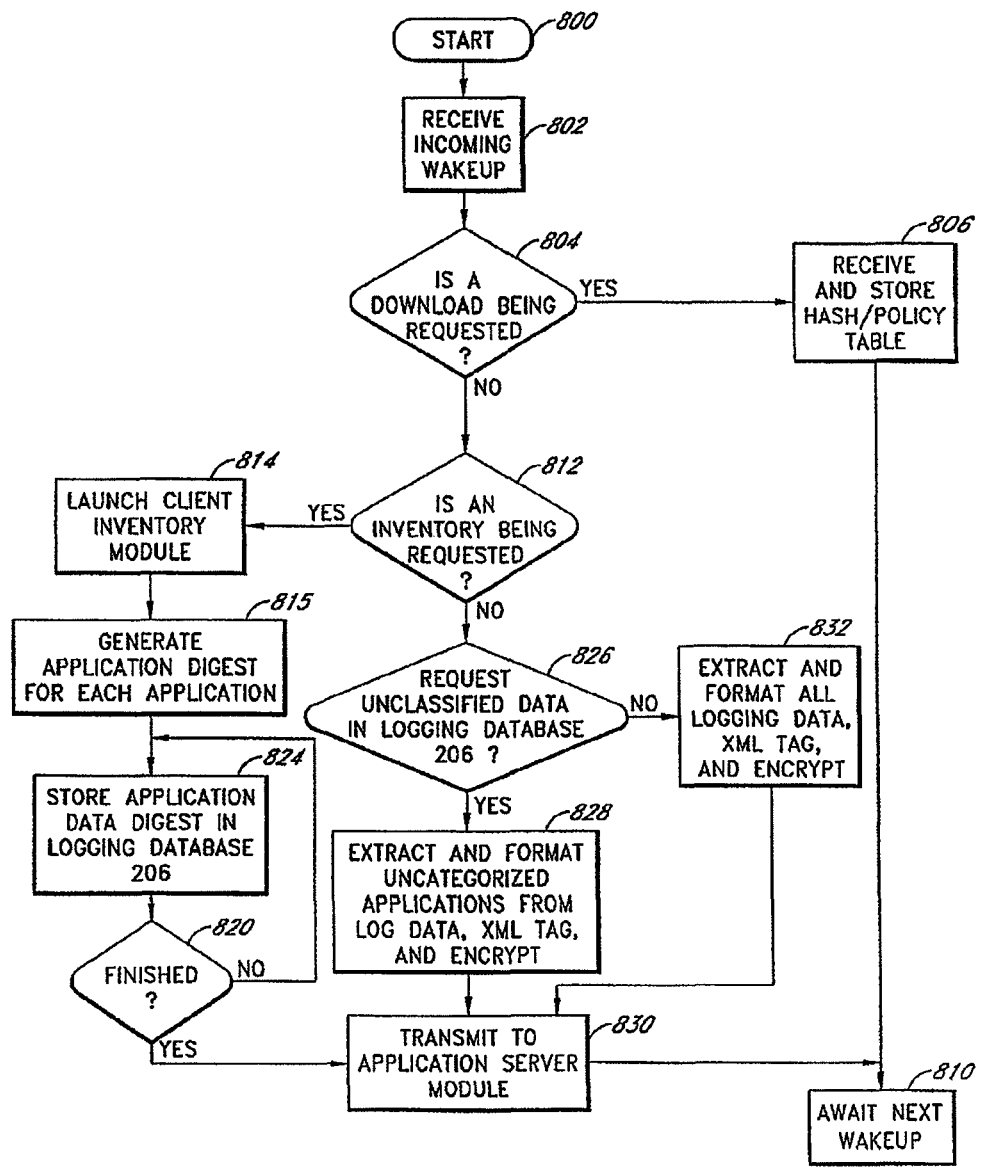
FIG. 8 is a flow diagram illustrating a process performed by the workstation for uploading and downloading collection data with the application server module.

FIG. 8 is a flow diagram illustrating a process performed by the workstation 101 for uploading and downloading collection data with the application server module 102. The process begins at a start state 800. Next, at a state 802, the upload/download module 203 receives an incoming signal from the workstation upload/download module 104. The process proceeds to a decision state 804 where the upload/download module 203 receives a request to download the hash/policy table 204 from the application server module 102. The time for receiving the download file can be periodic, random, added set time, or in response to polling. The upload/download module 203 and/or the workstation upload/download module 104 can initiate the download to the workstation management module 200.

If it is determined in state 804 that the upload/download module 203 is receiving a request to download from the application server module 102, the process moves to a state 806 where the upload/download module 203 receives and stores the hash/policy table 204 or a portion thereof.

For example, the application server module 102 can select data from the application inventory database 103 and policies from the policy database 109 for copying to the hash/policy table 204. The application inventory database 103 can include applications that have been categorized by the application database factory 110 as well as applications that have been categorized via the classification user interface 106. In some embodiments, the workstation upload/download module 104 transfers a portion of the hash/policy table 204. For example, the upload/download module 203 can receive an update so that the entire database need not be transmitted. In other embodiments, the upload/download module 203 receives a subset of the data from the application inventory database 103. For example, the selected data could be the hash values which are combined with the policies.

The downloaded data can update the existing hash/policy table 204. The downloaded data can be in the form of collection data from one or more sources. The sources can include the classification user interface 106 and the application database factory 110. As explained above, the collection data can include any additional data associated with the applications, for example, request frequencies associated with the applications from the application inventory database and/or request frequencies associated with the applications from the uncategorized application database 108, and/or indicators. The process moves to a state 810 where the upload/download module 203 awaits a wake-up signal from the application server module 102.

Returning to the decision state 804, if the upload/download module 203 is not requesting a download from the application server module 102, the process moves to a decision state 812 where the application server module 102 can request an inventory of the applications on the workstation 101. If the application server module 102 requests an inventory of the applications on the workstation 101, the process moves to a state 814 where the client inventory module 202 inventories the applications on the workstation 101. Once the client inventory module 202 compiles a list of the applications on the workstation 101, the process moves to a state 815 where the application digest generator 201 generates a digest of data relating to each application. The application digest generator 201 parses properties from the applications. Examples of such properties include the name, publisher, suite, hash, and version, which are associated with the applications.

The process then moves to a state 824 where the application and the digest are stored in the logging database 206. The process then moves to decision state 820 where the client inventory module 202 determines whether all of the inventoried applications have been stored in the logging database 206. If all of the inventoried applications have not been processed, flow returns to state 824 where the next application inventoried by the client inventory module 202 is processed as described above.

Returning to decision state 820, if all of the applications have been processed, the process moves to state 830 where the upload/download module 203 transmits the logging database 206 to the applications server module 102. Next, the process moves to state 810 where the upload/download module 203 awaits a wake-up signal from the application server module 102.

Returning to decision state 812, if an inventory is not requested by the application server module 102, the process moves to a decision state 826 to determine whether the application server module 102 is only requesting collection data from the logging database 206 for uncategorized applications. If the application server module 102 only requests data for uncategorized applications, the process moves to a state 828 wherein the upload/download module 203 extracts and formats data associated with the uncategorized applications from the logging database 206 for uploading to the application server module 102. The process next moves to a state 830 where the data associated with the uncategorized applications is transmitted to the application server module 102. The collection data uploaded to the application server module 102 can be formatted or unformatted. Additionally, the collection data can be encrypted and/or compressed or not. The workstation upload/download module 104 decrypts and uncompresses the collection data if decryption and/or uncompression is required. The workstation upload/download module 104 reassembles the collection data into a list of applications and any additional data associated with the applications. The workstation upload/download module 104 merges and sorts the collection data.

Next, the process moves to the state 810 where the workstation management module 200 awaits the next wake-up signal from the application server module 102.

Returning to the decision state 826, if the application server module 102 is not requesting only the collection data for the uncategorized applications from the logging database 206, the process moves to a state 832 where the upload/download module 203 extracts and formats all of the application data in the logging database 206. This data can include categorized data for applications that are listed in the hash/policy table 204 and uncategorized data for applications that are not listed in the hash/policy table 204. The collection data can be formatted or unformatted. Additionally, the collection data can be encrypted and/or compressed or not. Flow then proceeds to state 830 where the data from the logging database 206 is uploaded to the application server module 102. The flow then proceeds as described above to state 810 where the workstation management module 200 awaits a wake-up signal from the application server module 102.

Figure 9:
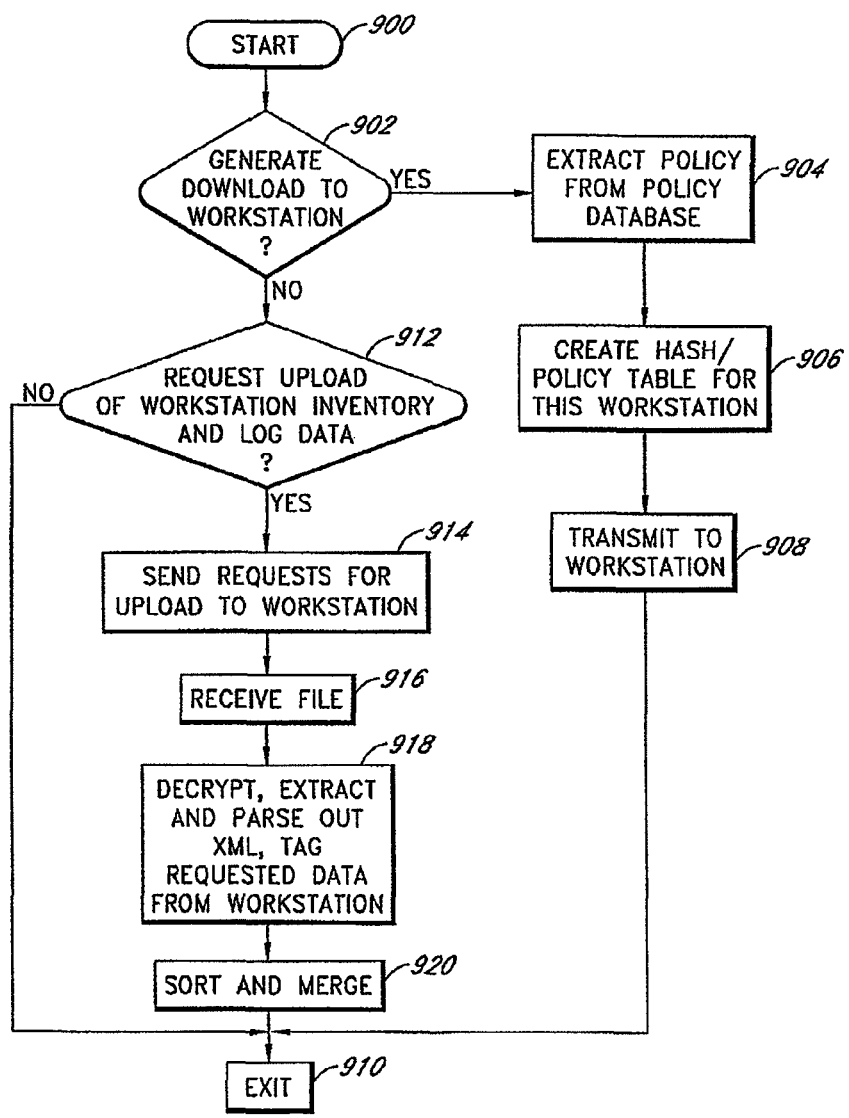
FIG. 9 is a flow diagram illustrating a process performed by the application server module for uploading and downloading collection data with the workstation.

FIG. 9 is a flow diagram illustrating a process performed by the application server module 102 for uploading and downloading collection data with the workstation 101. The process begins at a start state 900. Next, at a decision state 902, the workstation upload/download module 104 determines whether to generate a download to the workstation management module 200. The time for receiving the download can be periodic, random, at a set time, or in response to polling. The workstation upload/download module 104 and/or the upload/download module 203 can initiate the download to the workstation management module 200. If the workstation upload/download module 104 is to download to the workstation management module 200, the process moves to a state 904 where the workstation upload/download module 104 extracts policy data from the policy database 109. The policy database 109 associates access permissions to the parent groups and/or categories associated with each application based on the workstation receiving the download. For example, if a workstation were not designated to run applications relating to games, the policy database 109 would identify the parent groups and/or categories which are associated with games for that workstation. The network administrator, via the classification user interface 106, can update the policy database 109. The policy database 109 can include different access privileges for each workstation 101. In this way, different workstations 101 can have different policies associated with the applications running thereon.

The process moves to a state 906 where the workstation upload/download module 104 creates a hash/policy table from the application inventory database 103 in conjunction with the designated policies for this workstation. Each parent group and/or category is associated with the policies extracted from the policy database 109 for each of the one or more workstations receiving a download. Each application or hash in the application inventory database 103 can be associated with a parent group and/or category. Continuing with the example above, the workstation upload/download module 104 selects the hash values from the application inventory database 103 for applications that are associated with the parent group/or categories relating to games. Thus, the same application may be allowed to run on a workstation but not allowed to run on a different workstation. Flow continues to a state 908 where the workstation upload/download module 104 transmits the hash/policy table 204 or a portion thereof to the upload/download module 203. The download file can include the application names, hash values, associated categories, and/or associated policies. Flow then proceeds to end state 910.

Returning to decision state 902, if the workstation upload/download module 104 is not generating a download for the workstation 101, the process moves to a decision state 912 where the workstation upload/download module 104 determines whether to request an upload of the workstation inventory. The workstation inventory can include all, or a portion of, the logging database 206.

If the workstation upload/download module 104 requests an upload from the workstation 101, the process moves to a state 914 where a request is sent by the application server module 102 to the upload/download module 203. Next, at a state 916, the workstation upload/download module 104 receives the requested upload from the workstation 101. The uploaded data can be formatted or unformatted. Additionally, the uploaded data can be encrypted and/or compressed or not. The workstation upload/download module 104 decrypts and uncompresses the uploaded data if decryption and/or uncompression is required at next state 918.

Flow continues to state 920 where the workstation upload/download module 104 reassembles the uploaded data into a list of applications and any additional data associated with the applications. The workstation upload/download module 104 merges and sorts the collected data including the frequency count with other workstation inventories. The system can include thousands of workstation management modules, each of which is regularly uploading data from its logging database 206. As explained above, the uploaded data can include any additional data associated with the application, for example, directory location. The workstation upload/download module 104 can merge and sort the uploaded data based on the application or any additional data associated with the application. For example, the workstation upload/download module 104 can refer to a request frequency to sort and merge the applications from one or more workstations 101.

Figure 10:
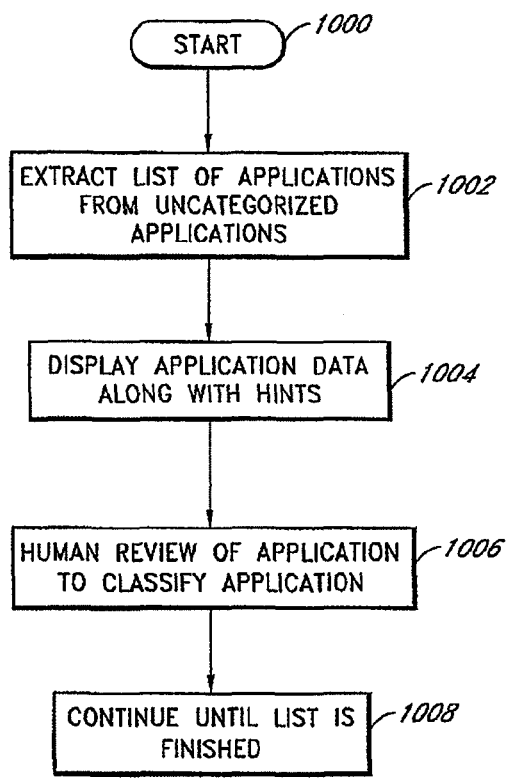
FIG. 10 is a flow diagram illustrating a process for classifying an uncategorized application at the application server module.

FIG. 10 is a flow diagram illustrating the process of categorizing the applications at the application server module 102. The process begins at a start state 1000. Next, at a state 1002, a network administrator launches the classification user interface 106 via the GUI. The GUI provides a graphical interface tool for the network administrator to manipulate and manage the application inventory database 103. The network administrator extracts a list of applications and/or associated data from the uncategorized application database 108 for review and categorization. The process moves to a state 1004 where the application and any related data is displayed for review by the network administrator. Next, at a state 1006, the network administrator classifies the application based on the displayed data. The process then moves to a state 1008 where the process returns to states 1004 and 1006 for each application extracted from the uncategorized application database 108.

Figure 11:
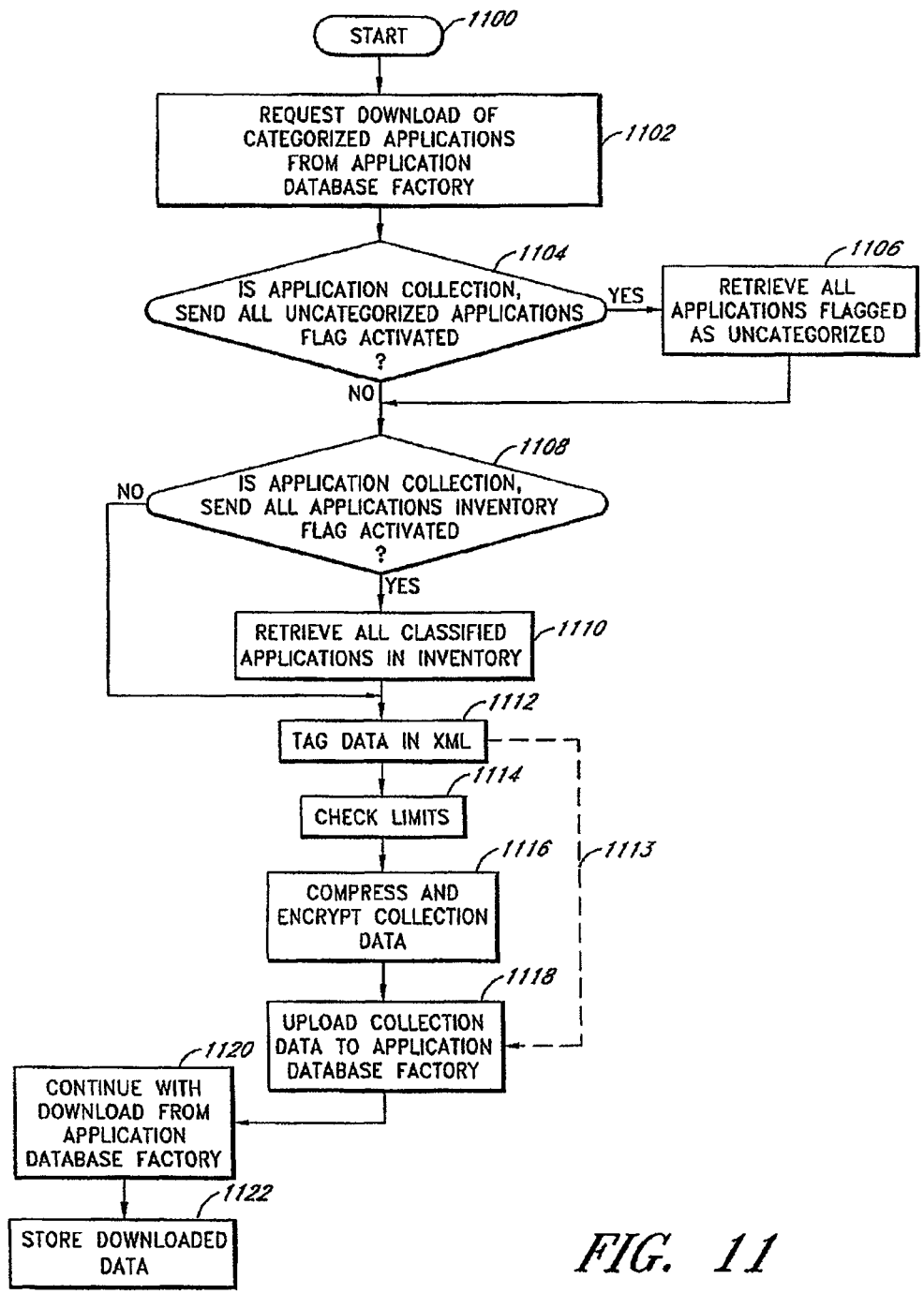
FIG. 11 is a flow diagram illustrating a process for uploading application data from the application server module to the application database factory.

FIG. 11 is a flow diagram illustrating the process of downloading the master application database 300 to the application server module 102 and for uploading inventoried application data from the application server module 102. The process begins at a start state 1100. Next, at a state 1102, the factory upload/download module 105 requests a download of the categorized applications from the application database factory 110. The categorized applications are stored in the master application database 300 at the application database factory 110. The time for receiving the categorized applications can be periodic, random, at a set time, or in response to polling. The factory upload/download module 105 and/or the upload/download module 301 can initiate the download to the application server module 102. As explained above, the downloaded data can include any additional data associated with the application.

Flow continues to decision state 1104 where the factory upload/download module 105 (see FIG. 3) determines whether a send all uncategorized application flag has been activated. The send all uncategorized application flag can be selected by the network administrator via the classification user interface 106. If the send all uncategorized application flag has been activated, the process moves to a state 1106 where the factory upload/download module 105 retrieves all applications from the uncategorized application database 108. Flow continues to decision state 1108 where the factory upload/download module 105 determines if the send all application inventory flag has been activated. The send all application inventory flag can be activated by the network administrator via the classification user interface 106. If the send all application inventory flag has been activated, the process moves to a state 1110 where the factory upload/download module 105 retrieves the data from the application inventory database 103. Flow moves to a state 1112 where the uncategorized applications and any additional data associated with the applications, for example, collection data, can be formatted. The additional data can include request frequencies and/or indicators associated with the applications. The collection data is not required to be formatted and thus may be directly uploaded to the application database factory 110. Moreover, the selection of a format for the collection data can depend on the type of data connection that the application database factory 110 has with the application server module 102. For a data connection via the Internet 108, the factory upload/download module 105 can use a markup language, for example, extensible markup language (XML), standard generalized markup language (SGML), and hypertext markup language (HTML), to format the collection data.

The collection data can be further processed prior to its upload to the application database factory 110. For example, check limit state 1114 and compression and encryption state 1116 can be performed to process the collection data prior to uploading to the application database factory 110. While these blocks may facilitate the upload of the collection data, they are not required to be performed. The collection data can be uploaded without applying states 1114 and 1116. In this way the process can follow alternate path 1113. Thus, the collection data can be directly uploaded to the application database factory 110 without applying states 1114 and 1116.

If further processing is desired, the process moves to a state 1114 where the factory upload/download module 105 can limit the collection data to a maximum size for uploading to the application database factory 110. For example, the collection data from a single workstation could be limited to a maximum of 20 megabytes. The process continues to a state 1116 where the collection data is compressed so that the collection data takes up less space. Further, the collection data is encrypted so that it is unreadable except by authorized users, for example, the application database factory 110.

Flow continues to a state 1118 where the collection data is uploaded to the application database factory 110. As explained above, the collection data can include any additional data associated with the application, for example, suite information. The process moves to a state 1120 where the upload/download module 301 continues with the download to the factory upload/download module 105. The process moves to a state 1122 where the downloaded data is stored in the application inventory database 103.

Returning to decision state 1108, if the send all application inventory flag is not activated, flow moves to state 1112 as described above. Since the send all application inventory flag was not activated, the factory upload/download module 105 formats the data retrieved at state 1106 for its upload to the application database factory 110 as described with reference to states 1112, 1114, 1116 and 1118.

Returning to decision state 1104, if the send all uncategorized application flag was not activated, the process moves to decision state 1108 as described above where the factory upload/download module 105 determines if the send all application inventory flag has been activated. Depending on whether the send all application inventory flag was activated, the process then continues as described above.

Figure 12:
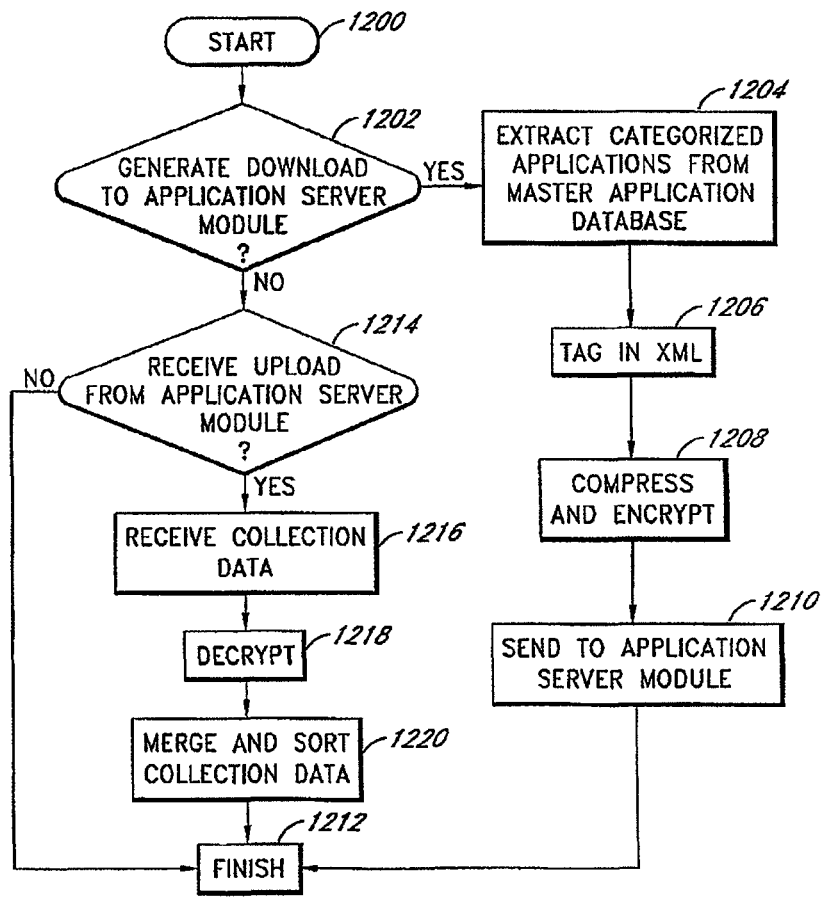
FIG. 12 is a flow diagram illustrating a process for downloading application data from the application database factory to the application server module.

FIG. 12 is a flow diagram illustrating a process for collecting data by the application database factory 110. The process begins at a state 1200. Next, at a decision state 1202, the application database factory 110 can download the master application database 300 to the application server module 102. If the application database factory 110 is to download the master application database 300 to the application server module 102, the process moves to a state 1204 where the upload/download module 301 extracts categorized applications from the master application database 300. A subset of the categorized applications can be selected for download to the application server module 102. The subset can include only categorized applications that have been deemed ready for publishing.

The process moves to a state 1206 where the application data retrieved from the master application database 300 can be formatted. The application data is not required to be formatted and this may be directly downloaded to the application server module 102. Moreover, the selection of a format for the data can depend on the type of data connection that the application database factory 110 has with the application server module 102. For a data connection via the Internet 108, the upload/download module 301 can use a markup language, for example, XML, SGML and HTML, to format the collection data.

The data to be downloaded can be further processed prior to its download to the application server module 102. The process continues to a state 1208 where the application data is compressed so that the application data takes up less space. Further, the application data is encrypted so that it is unreadable except by authorized users, for example, the application server module 102. Flow continues to a state 1210 where the application data is downloaded to the application server module 102. The process then moves to state 1212 which is an end state.

Returning to decision state 1202, if application data from the master application database 300 is not being downloaded to the application server module 102, the process moves to a decision state 1214 where the application database factory 110 can receive an upload from the application server module 102. If the application database factory 110 is not to receive an upload from the application server module 102, the process moves to end state 1212.

Returning to decision state 1214, if the application database factory 110 is to receive an upload from the application server module 102, the process moves to a state 1216 where the upload/download module 301 receives the upload from the factory upload/download module 105. The collection data may be received on a periodic basis, randomly, at a set time, or in response to polling. The upload/download module 301 and/or the factory upload/download module 105 can initiate the upload to the application database factory 110. As explained above, the collection can include any additional data associated with the application, for example, request frequencies associated with the application from the application inventory database 103 and/or request frequencies associated with applications from the uncategorized application database 108. The collection data can be formatted or unformatted. Additionally, the collection data can be encrypted and/or compressed or not.

The process continues to a state 1218 where the upload/download module 301 decrypts and uncompresses the collection data if decryption and/or uncompression is required. The process moves to a state 1220 where the collection data is merged and sorted into the master application database 300 and the uncategorized application database 303. The process then continues to end state 1212.

FIG. 13 is a flowchart illustrating the process of classifying applications from the uncategorized application database 303. The process begins at start state 1300. The process moves to a state 1302 where a list of applications is extracted from the uncategorized application database 303 for classification by the human reviewer via the application analyst's classification module 302. The application analyst classification module 302 interfaces with the human reviewer to determine the appropriate category or categories of the application. Next, at a state 1304, the application analyst's classification module 302 is utilized to display the application and any related data on the GUI. The related data can indicate to the human reviewer the category or categories with which the application should be associated. As explained above, the application analyst classification module 302 allows the human reviewer to analyze each application and any additional data that is associated with the application to determine its appropriate category or categories.

The process continues to a state 1306 where the human reviewer uses the application, related information, and any Internet information to research the application. The Internet information can be derived from a search using a web browser search engine. The application name and any of the related application data can be used for the Internet search. The human reviewer can further review documents, specifications, manuals, and the like to best determine the category or categories to associate with the application. The process continues to a state 1308 where the human reviewer classifies each application using the evidence associated with the application, any hints from the related information, and/or other research.

The process finally moves to a state 1310 where the selected category or categories that the human reviewer associated with the given application is stored in the master application database 300.

FIGS. 14-20 describe processes for monitoring the network behavior of an application. While the processes described with reference to FIGS. 7 through 13 were directed to controlling applications when the applications are launched on the workstation, the processes described with reference to FIGS. 14-20 are directed to controlling the operation of the application after the application is initially launched. For example, the execution launch detection module 210 initially evaluates a launched application and allows the application to run on the workstation based on the policy associated with the category or group of the application. Standing alone, the execution launch detection module 210 controls what applications are allowed to operate on any given workstation.

However, the subsequent operation of the application is monitored by the network access detection module 208. Thus, even though an application is allowed to launch on a given workstation, the network access detection module 208 may curtail or limit the application if the application does not operate in a predetermined manner. Further, the network access detection module 208 can continually or periodically monitor the running application to ensure that the applications continues to operate in the predetermined manner.

Figure 14:
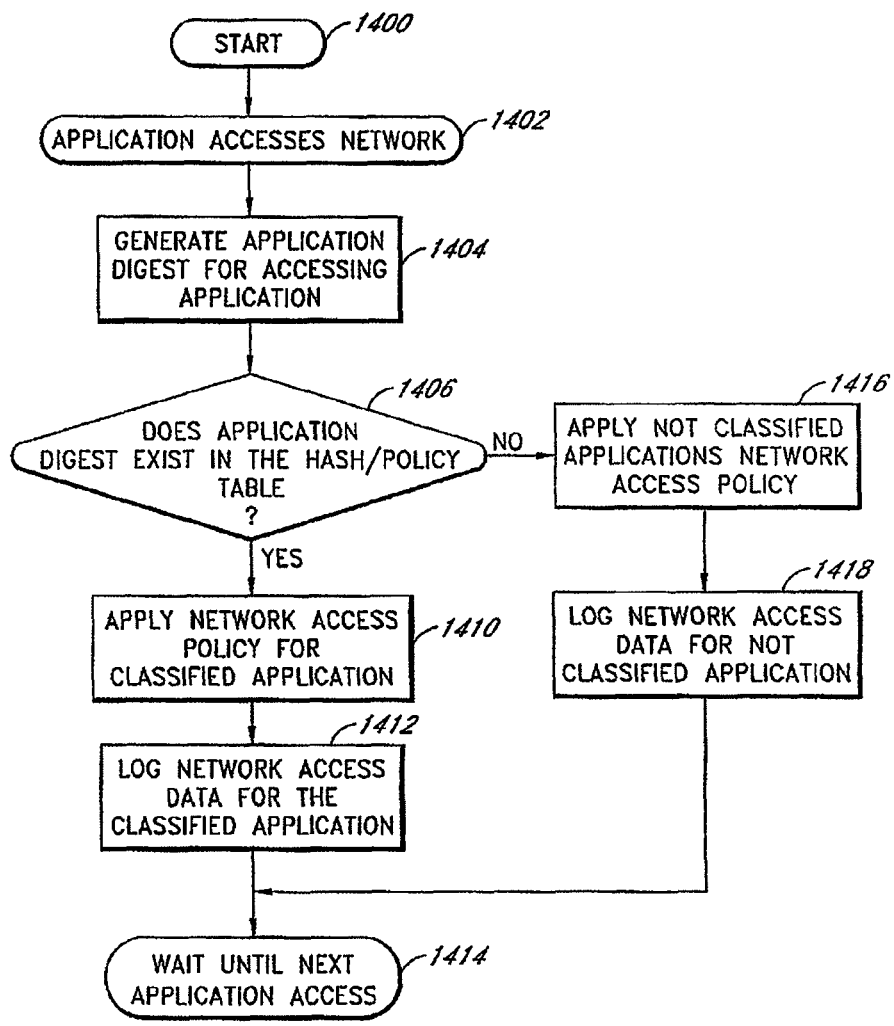
FIG. 14 is a flow diagram illustrating a process for monitoring and controlling the behavior of a launched application on the workstation.

FIG. 14 is a flow diagram illustrating a process for monitoring the behavior of an application. In addition to monitoring behavior, the process can curtail or control the behavior of the application. The process monitors applications that request access to a network upon launch as well as applications that request access to the network after launch. Thus, applications that the execution launch detection module 210 allows to run on the workstation 101 may or may not be allowed to access the network.

The process begins at a start state 1400. Next, at a state 1402, an application requests access to a network. The request to access the network can be in response to a predetermined startup sequence for the workstation 101. For example, the workstation 101 could be programmed to access one or more networks upon power-on startup. Upon launch or after launch, an application may request access to a publisher's website to download software updates. This request for access may be in response to a user input or the application itself.

The network access detection module 208 (see FIG. 2) detects the network access of the application. Next, at a state 1404, the application digest generator 201 generates a digest of data relating to the application. The digested data can be in the form of collection data. The collection data can include, for example, source IP address, destination IP address, source port number, destination port number and other network access data.

The process moves to a decision state 1406 where the network access detection module 208 compares the application digest and collection data prepared by the application digest generator 201 to the hash/policy table 204. For example, a hash generated by the application digest generator 201 and collection data can be compared to hashes from the hash/policy table 204 and network access data associated with the hash. In one embodiment, a plurality of different hashes is generated and compared to hashes from the hash/policy table 204. For example, an MD-5 hash and an SHA-1 hash could be generated for the requested application and compared to MD-5 hashes and SHA-1 hashes from the hash/policy table 204. In this way, the behavior of the application is monitored by the network access detection module 208.

If the hash and collection data corresponds to a hash stored in the hash/policy table 204 and the collection data associate with the hash in the hash/policy table 204, the process continues to a state 1410 where the policy associated with the hash is applied in response to the network access request. In this case, the behavior or network attributes of the application matches with an expected behavior for the application. These policies can include allowing the application to access the network, denying access to the network, alerting the user that access to the network may receive further scrutiny by the network administrator, or allow for a certain amount of time for accessing the network. For example, at the end of a specified time the network access detection module 208 does not permit the application to continue accessing the network. Next, at a state 1412, the network access detection module 208 logs the network access data for the classified application to the logging database 206. In this way, a record is maintained of the applications that are allowed to access the network. The process then moves to a state 1414 where the network access detection module 208 monitors the system in order to detect the next network access by the same or another application on the workstation 101.

The retrieved information from the hash/policy table 204 further includes a policy associated with the hash value. In one embodiment, category and/or parent group information that corresponds to the hash value is utilized in selecting the policy. For example, a hash value could be associated with a specific parent group. For example, the parent group could include "productivity," "communication," "expected or pre-determined network access," and "unexpected network access." The parent groups "expected or predetermined network access" and "unexpected network access" may be sub-groups or categories within another group. For example, a hash for a word processing application is associated with the group "productivity," and sub-categories "word process-ing" and "expected or predetermined network access." The sub-category "expected or predetermined network access" could then be associated with a policy that allows the access to the network. The sub-category "unexpected network access" could then be associated with a policy that does not allow access to the network or curtails or limits access to the network.

Returning to the decision state 1406, if the application digest and collection data does not correspond with an application or hash classified in the hash/policy table 204, flow moves to a state 1416 where the network access detection module 208 applies a not-classified application policy to the request to access to the network. The not-classified application policy can include, for example, allowing the application to access the network, denying access, or alerting the user that additional scrutiny will be applied to the network access, while limiting the amount of time that the application is allowed to access the network.

Flow moves to a state 1418 where the network access data for the not-classified application is logged to the logging database 206. The process continues to state 1414 as described above where the network access detection module 208 awaits a request to access the network from the same application or different application.

Figure 15:
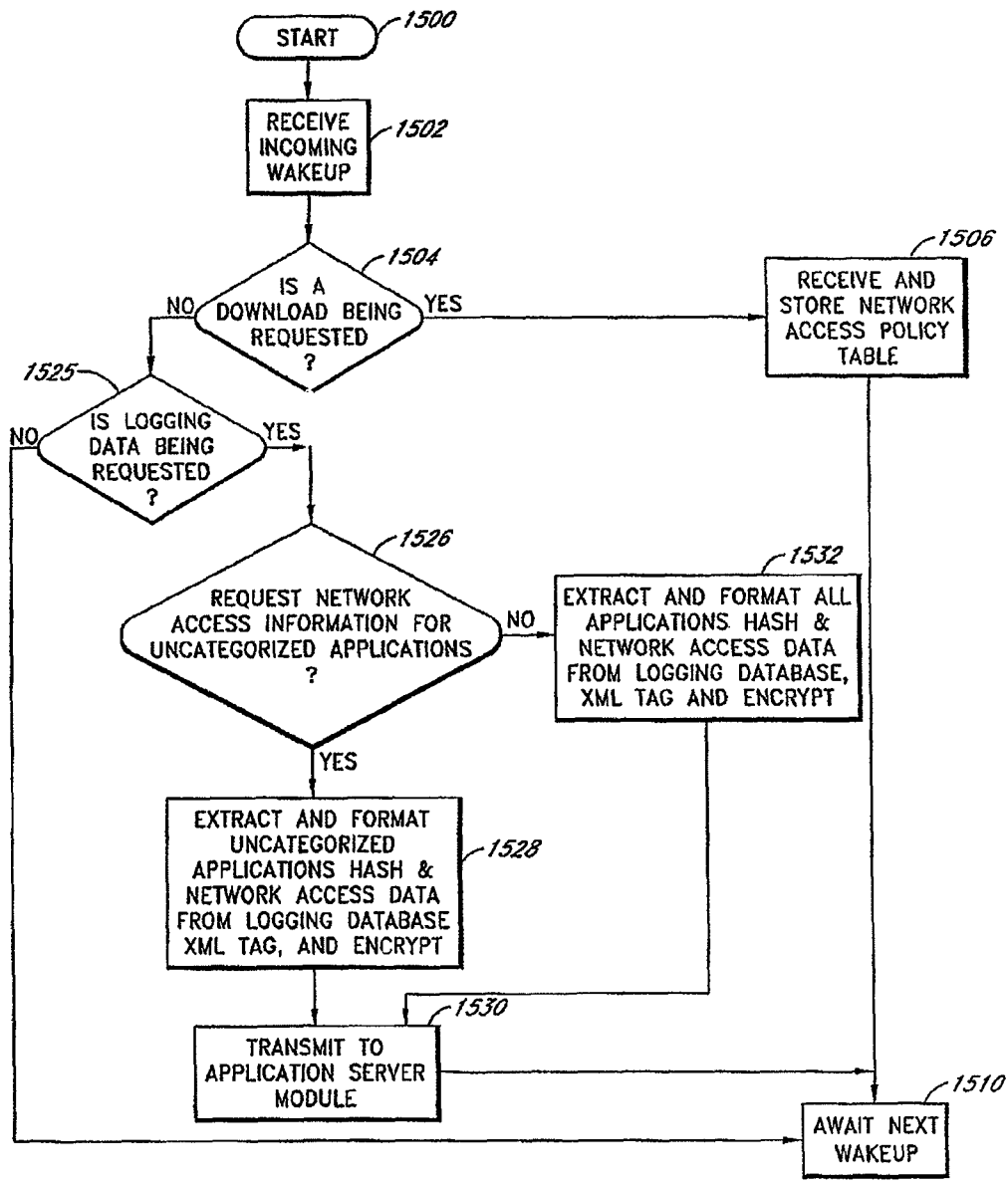
FIG. 15 is a flow diagram illustrating a process performed by the workstation for uploading and downloading collection data for network accessing applications with the application server module.

FIG. 15 is a flow diagram illustrating a process performed by the workstation for uploading and downloading collection data related to the network accessing applications with the application server module 102. The process begins at a start state 1500. Next, at a state 1502, the upload/download module 203 receives an incoming signal from the workstation upload/download module 104. The process proceeds to a decision state 1504 where the upload/download module 203 receives a request to download the hash/policy table 204 from the application server module 102. The time for receiving the download file can be periodic, random, added set time, or in response to polling. The upload/download module 203 and/or the workstation upload/download module 104 can initiate the download to the workstation management module 200.

If it is determined in state 1504 that the upload/download module 203 is receiving a request to download from the application server module 102, the process moves to a state 1506 where the upload/download module 203 receives and stores the hash/policy table 204 or a portion thereof. The hash\policy table 204 can include collection data in the form of network access data.

For example, the application server module 102 can select data from the application inventory database 103 and policies from the policy database 109 for copying to the hash/policy table 204. The application inventory database 103 can include applications that have been categorized by the application database factory 110. The application can be categorized via the classification user interface 106.

A categorized application is an application that is associated with collection data. The collection data can include network access data. In some embodiments, the workstation upload/download module 104 transfers a portion of the hash/policy table 204. For example, the upload/download module 203 can receive an update so that the entire database need not be transmitted. In other embodiments, the upload/download module 203 receives a subset of the data from the application inventory database 103. For example, the selected data could be the hash values which are combined with the policies.

The downloaded data can update the existing hash/policy table 204. The downloaded data can be in the form of collection data from one or more sources. The sources can include the classification user interface 106 and the application database factory 110. As explained above, the collection data can include any additional data associated with the applications, for example, request frequencies associated with the applications from the application inventory database and/or request frequencies associated with the applications from the uncategorized application database 108, and/or indicators. As explained above, the application inventory database 103 can include the uncategorized application database 108 and the network access database 107. Alternatively, the uncategorized application database 108 and/or the network access database 107 are combined into a single database or can be separate databases from the application inventory database 103. The uncategorized application database 108 can include applications which are not classified or categorized along with applications that are not operating in an expected or predetermined manner. The network access data associated with the application may be stored in the network access database 107, the uncategorized application database 108, and/or the application inventory database 103.

The process moves to a state 1510 where the upload/download module 203 awaits a wake-up signal from the application server module 102.

Returning to the decision state 1504, if the upload/download module 203 is not requesting a download from the application server module 102, the process moves to a decision state 1525 to determine whether the application server module 102 is requesting collection data from the logging database 206. If the application server module 102 is not requesting logging data, the process moves to state 1510 as described above. Returning to decision state 1525, if the application server module 102 is requesting logging data, the process moves to decision state 1526 to determine whether the application server module 102 is only requesting collection data from the logging database 206 for uncategorized applications. The uncategorized applications can include applications that were previously categorized but are not operating in a predetermined or expected manner.

If the application server module 102 only requests data for uncategorized applications, the process moves to a state 1528 wherein the upload/download module 203 extracts and formats data associated with the uncategorized applications from the logging database 206 for uploading to the application server module 102. The process next moves to a state 1530 where the data is transmitted to the application server module 102. The collection data uploaded to the application server module 102 can be formatted or unformatted. Additionally, the collection data can be encrypted and/or compressed or not. The workstation upload/download module 104 decrypts and uncompresses the collection data if decryption and/or uncompression is required. The workstation upload/download module 104 reassembles the collection data into a list of applications and any additional data associated with the applications. The workstation upload/download module 104 merges and sorts the collection data.

Next, the process moves to the state 1510 where the workstation management module 200 awaits the next wake-up signal from the application server module 102.

Returning to the decision state 1526, if the application server module 102 is requesting more than the collection data for the uncategorized applications from the logging database 206, the process moves to a state 1532 where the upload/download module 203 extracts and formats all of the application data in the logging database 206. This data can include categorized data for applications that are listed in the hash/policy table 204 and uncategorized data for applications that are not listed in the hash/policy table 204. The collection data can be formatted or unformatted. Additionally, the collection data can be encrypted and/or compressed or not. Flow then proceeds to state 1530 where the data is uploaded to the application server module 102. The flow then proceeds as described above to state 1510 where the workstation management module 200 awaits a wake-up signal from the application server module 102.

Figure 16:
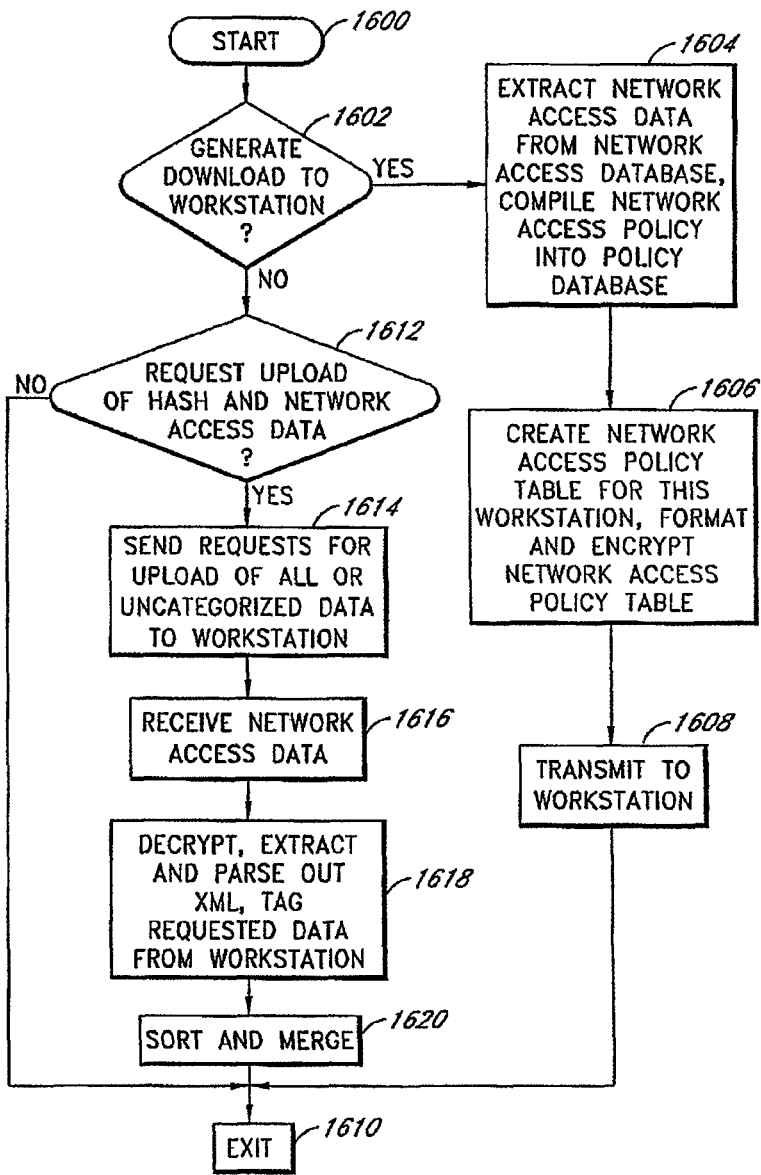
FIG. 16 is a flow diagram illustrating a process performed by the application server module for uploading and downloading collection data for network accessing applications with the workstation.

FIG. 16 is a flow diagram illustrating a process performed by the application server module for uploading and downloading collection data for network accessing applications with the workstation 101. The process begins at a start state 1600. Next, at a decision state 1602, the workstation upload/download module 104 determines whether to generate a download to the workstation management module 200. The time for receiving the download can be periodic, random, at a set time, or in response to polling. The workstation upload/download module 104 and/or the upload/download module 203 can initiate the download to the workstation management module 200. If the workstation upload/download module 104 is to download to the workstation management module 200, the process moves to a state 1604 where the workstation upload/download module 104 extracts network access data from the network access database 107. The network access data is compiled into a policy database 109. The policy database 109 associates access permissions to each application based on which workstation receives the download. The policy database 109 can include different access privileges for each workstation 101. In this way, different workstations 101 can have different policies associated with the same application running thereon.

The process moves to a state 1606 where the workstation upload/download module 104 creates a network access policy table in conjunction with the designated policies for this workstation. Thus, the same application may be allowed to access a website from a workstation but not allowed to access the same website from a different workstation.

Flow continues to a state 1608 where the workstation upload/download module 104 transmits the network access policy table or a portion thereof to the upload/download module 203. The download file can include the application names, hash values, associated categories, and/or associated policies. Flow then proceeds to end state 1610.

Returning to decision state 1602, if the workstation upload/download module 104 is not generating a download for the workstation 101, the process moves to a decision state 1612 where the workstation upload/download module 104 determines whether to request an upload of the hash and network access data. The hash and network access data can include all, or a portion of, the logging database 206.

If the workstation upload/download module 104 requests an upload from the workstation 101, the process moves to a state 1614 where a request for all or only uncategorized data is sent by the application server module 102 to the upload/download module 203. Next, at a state 1616, the workstation upload/download module 104 receives the requested upload from the workstation 101. The uploaded data can be formatted or unformatted. Additionally, the uploaded data can be encrypted and/or compressed or not. The workstation upload/download module 104 decrypts and uncompresses the uploaded data if decryption and/or uncompression is required at next state 1618.

Flow continues to state 1620 where the workstation upload/download module 104 reassembles the uploaded data into a list of applications and any additional data associated with the network access. The workstation upload/download module 104 merges and sorts the collected data including the frequency count with other workstation inventories. The system can include thousands of workstation management modules, each of which is regularly uploading data from its logging database 206. As explained above, the uploaded data can include any additional data associated with the network access, for example, the source IP address, destination IP address, source port number, destination port number and other network access data. The workstation upload/download module 104 can merge and sort the uploaded data based on the application or any additional data associated with the request for network access. For example, the workstation upload/download module 104 can refer to a destination IP address to sort and merge the applications from one or more workstations 101.

Figure 17:
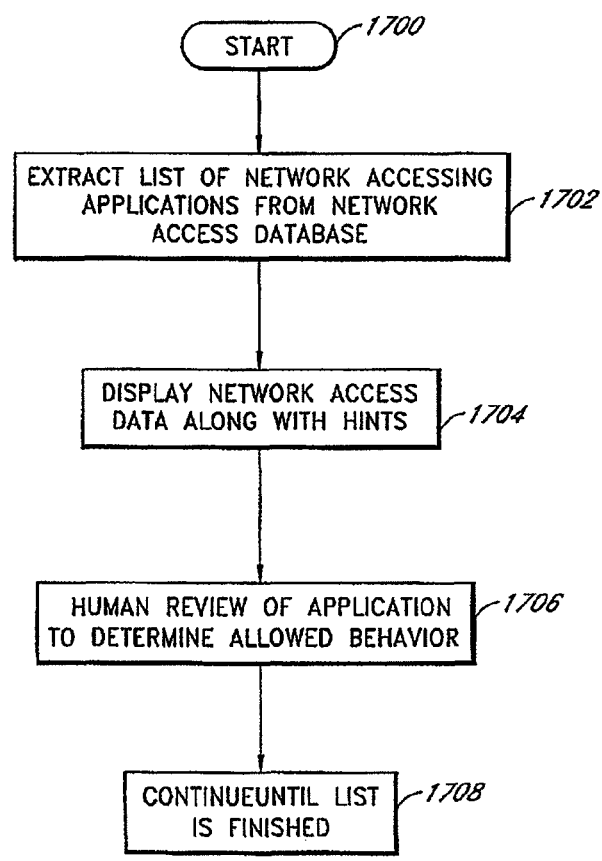
FIG. 17 is a flow diagram illustrating a process for analyzing network access data for a launched application at the application server module.

FIG. 17 is a flow diagram illustrating a process for analyzing network access data associated with an application's request to access the network at the application server module 102. The process begins at a start state 1700. Next, at a state 1702, a network administrator launches the classification user interface 106 via the GUI. The GUI provides a graphical interface tool for the network administrator to manipulate and manage the application inventory database 103. The network administrator extracts a list of applications and data from the network access database 107.

The process moves to a state 1704 where the application and any related data is displayed for review by the network administrator. Next, at a state 1706, the network administrator determines the allowed behavior for the application. The process then moves to a state 1708 where the process returns to states 1704 and 1706 for each application extracted from the network access database 107.

Figure 18:
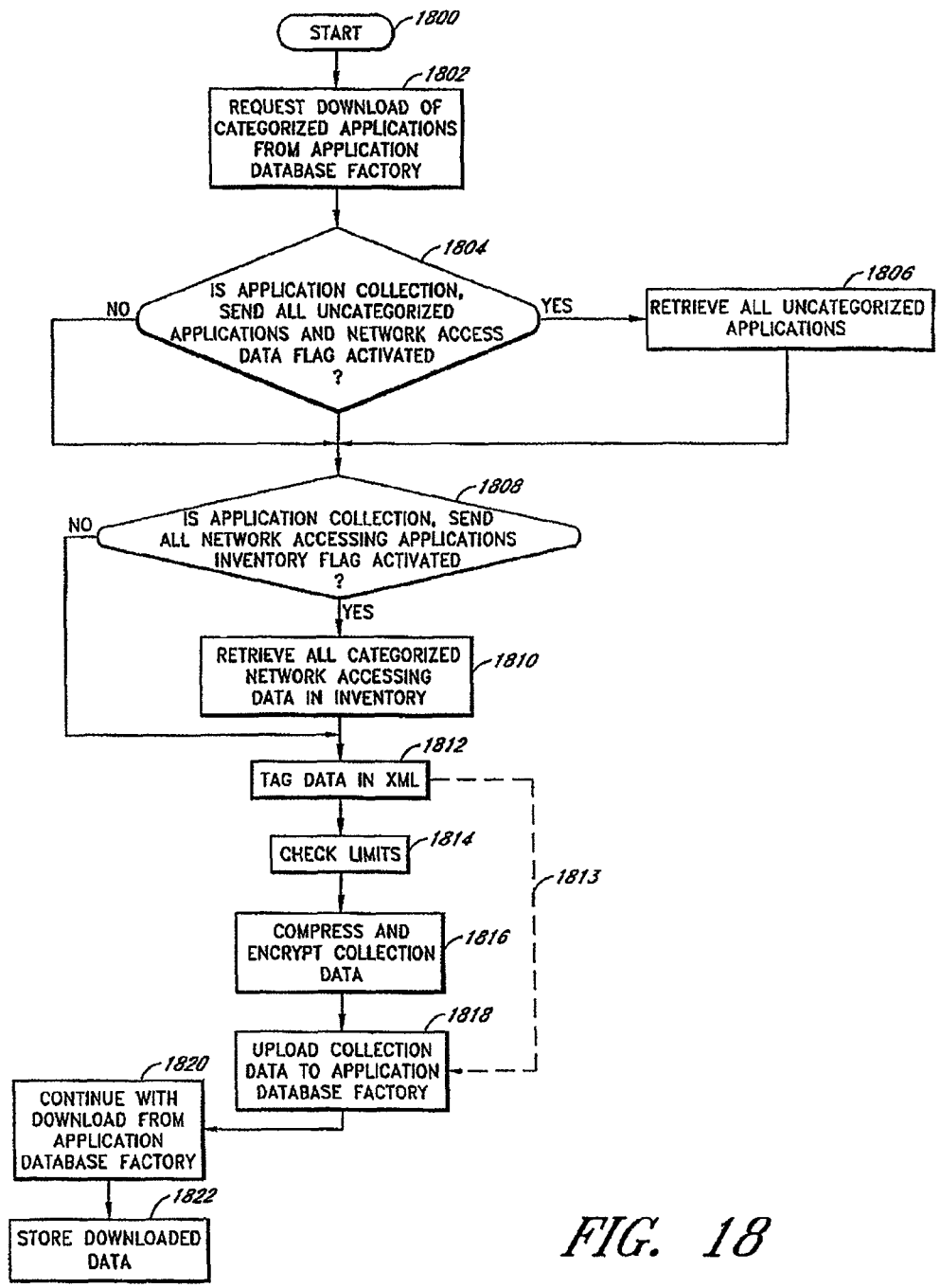
FIG. 18 is a flow diagram illustrating a process for uploading network access data from the application server module to the application database factory.

FIG. 18 is a flow diagram illustrating a process for uploading network access data from the application server module to the application database factory. The process begins at a start state 1800. Next, at a state 1802, the factory upload/download module 105 requests a download of the categorized applications from the application database factory 110. The categorized applications are stored in the master application database 300 at the application database factory 110. The time for receiving the categorized applications can be periodic, random, at a set time, or in response to polling. The factory upload/download module 105 and/or the upload/download module 301 can initiate the download to the application server module 102. As explained above, the downloaded data can include any additional data associated with the application. The additional data can include network access data.

Flow continues to decision state 1804 where the factory upload/download module 105 (see FIG. 3) determines whether a send all uncategorized applications network access data flag has been activated. The flag can be selected by the network administrator via the classification user interface 106. If the flag has been activated, the process moves to a state 1806 where the factory upload/download module 105 retrieves all uncategorized applications. Flow continues to decision state 1808 where the factory upload/download module 105 determines if the send all network access application inventory flag has been activated. The send all network access application inventory flag can be activated by the network administrator via the classification user interface 106. If the send all network access application inventory flag has been activate, the process moves to a state 1810 where the factory upload/download module 105 retrieves the data from the application inventory database 103. Flow moves to a state 1812 where the uncategorized applications and any additional data associated with the applications, for example, collection data, can be formatted. The additional data can include a source IP address, destination IP address, source port number, destination port number and other network access data associated with the applications. The collection data is not required to be formatted and thus may be directly uploaded to the application database factory 110. Moreover, the selection of a format for the collection data can depend on the type of data connection that the application database factory 110 has with the application server module 102. For a data connection via the Internet 108, the factory upload/download module 105 can use a markup language, for example, extensible markup language (XML), standard generalized markup language (SGML), and hypertext markup language (HTML), to format the collection data.

The collection data can be further processed prior to its upload to the application database factory 110. For example, check limit state 1814 and compression and encryption state 1816 can be performed to process the collection data prior to uploading to the application database factory 110. While these blocks may facilitate the upload of the collection data, they are not required to be performed. The collection data can be uploaded without applying states 1814 and 1816. In this way the process can follow alternate path 1813. Thus, the collection data can be directly uploaded to the application database factory 110 without applying states 1814 and 1816.

If further processing is desired, the process moves to a state 1814 where the factory upload/download module 105 can limit the collection data to a maximum size for uploading to the application database factory 110. For example, the collection data from a single workstation could be limited to a maximum of 20 megabytes. The process continues to a state 1816 where the collection data is compressed so that the collection data takes up less space. Further, the collection data is encrypted so that it is unreadable except by authorized users, for example, the application database factory 110.

Flow continues to a state 1818 where the collection data is uploaded to the application database factory 110. As explained above, the collection data can include any additional data associated with the application, for example, destination port information. The process moves to a state 1820 where the upload/download module 301 continues with the download to the factory upload/download module 105. The process moves to a state 1822 where the downloaded data is stored in the application inventory database 103.

Returning to decision state 1808, if the send all network access application inventory flag is not activated, flow moves to state 1812 as described above. Since the send all network access application inventory flag was not activated, the factory upload/download module 105 formats the data retrieved at state 1806 for its upload to the application database factory 110 as described with reference to states 1812, 1814, 1816 and 1818.

Returning to decision state 1804, if the send all uncategorized applications network access flag was not activated, the process moves to decision state 1808 as described above where the factory upload/download module 105 determines if the send all network access application inventory flag has been activated. Depending on whether the send all network access application inventory flag was activated, the process then continues as described above.

Figure 19:
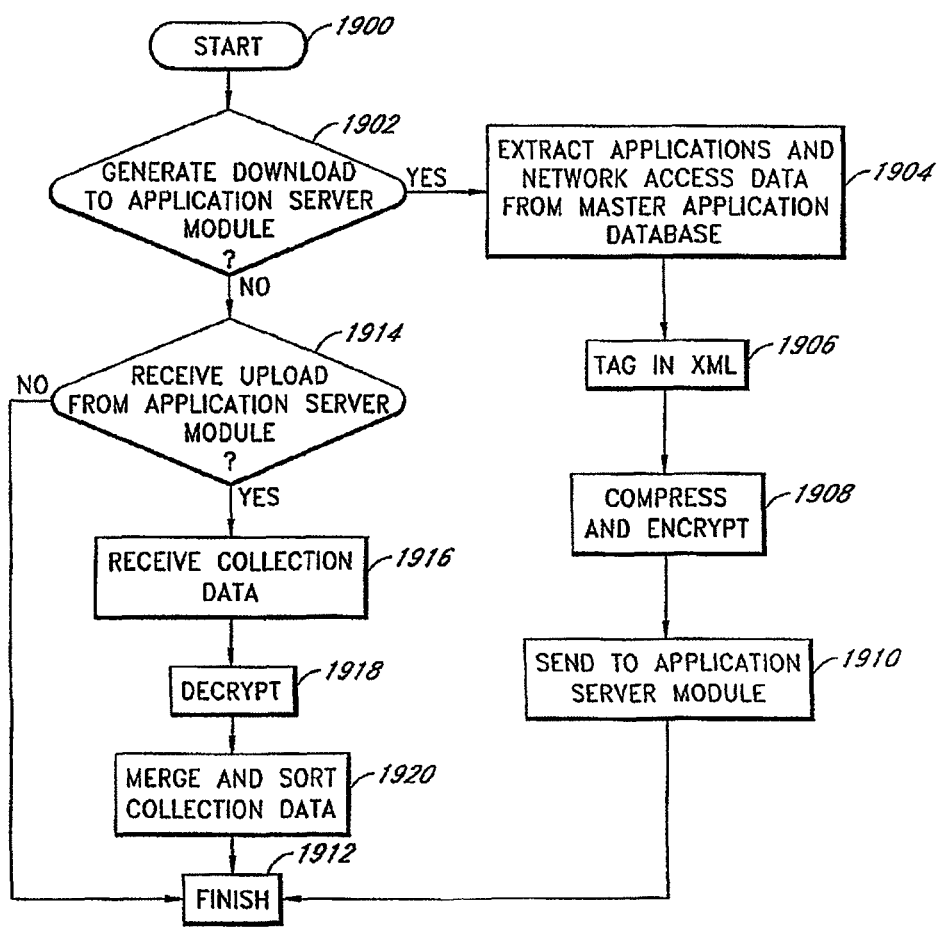
FIG. 19 is a flow diagram illustrating a process for downloading network access data from the application database factory to the application server module.

FIG. 19 is a flow diagram illustrating a process for downloading network access data from the application database factory to the application server module. The process begins at a state 1900. Next, at a decision state 1902, the application database factory 110 can download the master application database 300 to the application server module 102. If the application database factory 110 is to download the master application database 300 to the application server module 102, the process moves to a state 1904 where the upload/download module 301 extracts categorized applications from the master application database 300. A subset of the categorized applications can be selected for download to the application server module 102. The subset can include only categorized applications that have been deemed ready for publishing.

The process moves to a state 1906 where the application data retrieved from the master application database 300 can be formatted. The application data is not required to be formatted and this may be directly downloaded to the application server module 102. Moreover, the selection of a format for the data can depend on the type of data connection that the application database factory 110 has with the application server module 102. For a data connection via the Internet 108, the upload/download module 301 can use a markup language, for example, XML, SGML and HTML, to format the collection data.

The data to be downloaded can be further processed prior to its download to the application server module 102. The process continues to a state 1908 where the application data is compressed so that the application data takes up less space. Further, the application data is encrypted so that it is unreadable except by authorized users, for example, the application server module 102. Flow continues to a state 1910 where the application data is downloaded to the application server module 102. The process then moves to state 1912 which is an end state.

Returning to decision state 1902, if application data from the master application database 300 is not being downloaded to the application server module 102, the process moves to a decision state 1914 where the application database factory 110 can receive an upload from the application server module 102. If the application database factory 110 is not to receive an upload from the application server module 102, the process moves to end state 1912.

Returning to decision state 1914, if the application database factory 110 is to receive an upload from the application server module 102, the process moves to a state 1916 where the upload/download module 301 receives the upload from the factory upload/download module 105. The time for receiving the collection data can be periodic, random, at a set time, or in response to polling. The upload/download module 301 and/or the factory upload/download module 105 can initiate the upload to the application database factory 110. As explained above, the collection can include any additional data associated with the application, for example, a source IP address, destination IP address, source port number, destination port number and other network access data associated with the application from the application inventory database 103 and/or a source IP address, destination IP address, source port number, destination port number and other network access data associated with applications from the uncategorized application database 108 and/or the network access database 304. The collection data can be formatted or unformatted. Additionally, the collection data can be encrypted and/or compressed or not.

The process continues to a state 1918 where the upload/download module 301 decrypts and uncompresses the collection data if decryption and/or uncompression is required. The process moves to a state 1920 where the collection data is merged and sorted into the master application database 300 and the uncategorized application database 303 and/or the network access database 304. The process then continues to end state 1912.

FIG. 20 is a flow diagram illustrating a process for analyzing the network access data associated with an application at the application database factory. The process begins at start state 2000. The process moves to a state 2002 where a list of applications is extracted from the uncategorized application database 303 and/or the network access database 304 for classification by the human reviewer via the application analyst's classification module 302. The application analyst classification module 302 interfaces with the human reviewer to determine the appropriate category or categories of the application. These categories may include "expected or predetermined network access" and "unexpected network access." The category "expected or predetermined network access" could then be associated with a policy that allows the access to the network. The category "unexpected network access" could then be associated with a policy that does not allow access to the network.

Next, at a state 2004, the application analyst's classification module 302 is utilized to display the application and any related data on the GUI. The related data can indicate to the human reviewer the expected network activity for the application. As explained above, the application analyst classification module 302 allows the human reviewer to analyze each application and any additional data that is associated with the application to determine an expected or allowed network activity.

The process continues to a state 2006 where the human reviewer analyzes the application, related information, and any Internet related information. The Internet information can be derived from a search using a web browser search engine. The application name and any of the related collection data can be used for the Internet search.

The expected or allowed network activity can be based upon prior or contemporaneous network activity for the same application. For example, the expected network activity for an application running on a first workstation 101 can be determined from a record of that application's prior activity on the first workstation. In addition or in the alternative, the expected network activity for an application is determined from a record of that application's prior activity on multiple workstations.

The expected network activity can be determined from network activity by a different but related application. For example, the programs or applications from a single software company may have common access privileges. The access privilege associated with a later version of an application may share common access privileges with an earlier version of the same application.

The network activity of the same application running on different workstations can be weighted in a predetermined manner to determine an expected network activity for the application. The expected network activity can determine a common access privilege for multiple workstations. The workstation management module stores the expected network activity in the hash/policy table 204. In a preferred embodiment, the network activity from multiple workstations is uploaded to the application database factory 110. The access privilege can be determined at the application database factory 110.

The expected network activity for a given application can include one or more network attributes that are associated with the application. The attributes are associated with the application when the application accesses the network in an expected manner. These attributes can include, for example, a specific protocol, a specific I. P. address, and a specific access port. For example, the specific protocol for an application is listed in the hash/policy table 204. If the application requests access to the network using a different protocol than the expected protocol listed in the hash/policy table 204, the network access detection module 208 may disallow access.

An application may request access to the network multiple times in a single day. However, one or more of the network attributes associated with the application may be different for each attempted access. In this way, the attributes of the application may change over time. The network detection access module 208 may allow a first combination of one or more network attributes while disallowing a second combination of the one or more network attributes. The human reviewer can further review documents, specifications, manuals, and the like to best determine the expected or allowed behavior for the network requesting application.

Each combination of the one or more attributes can be associated with one or more categories. The one or more categories can be further associated with the policies or rules for the workstation 101 and/or user.

The process continues to a state 2008 where the human reviewer determines the allowed behavior for the application using the evidence associated with the application, any hints from the related information, and/or other research. The process finally moves to a state 2010 where the allowed behavior for the network requesting application is stored in the master application database 300.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A method of updating a system which controls operation of programs on a workstation, the method comprising:
   detecting a network access attempt by an application;
   generating an application digest for the application;
   determining whether the application is associated with one or more policies;
   if the application is associated with one or more policies, then applying the one or more policies that are associated with the application;
   if the application is not associated with a policy, then sending the application digest to an application server module;
   determining whether the application is operating in a predetermined manner based at least in part on analyzing past network activity involving the same or relevant applications and text strings associated with the application;
   if the application is not operating in the predetermined manner, then send the application digest to an application database factory, if the application is operating in the predetermined manner, then apply the one or more policies associated with the application;
   determining whether each application has been previously analyzed;
   for each application that was not previously analyzed, assigning one or more categories to at least one of each application or application digest associated with the application;
   posting each application along with its assigned one or more categories into a database of categorized applications; and
   receiving the database of categorized applications by the application server module.

2. The method of claim 1, further comprising:
   updating a frequency if the application is in an application inventory database; and
   uploading the application inventory database to the application database factory.

3. The method of claim 1, wherein the one or more policies include allowing or disallowing the application to access the network.

4. The method of claim 1, wherein the application digest includes additional data associated with the application.

5. The method of claim 4, wherein the additional data includes a destination port number.

6. The method of claim 4, wherein the additional data includes a source IP address.

7. The method of claim 1, further comprising:
   analyzing at least one of the application or application digest associated with the application for data characteristics that are indicative of the one or more categories; and
   associating one or more indicators with the application.

8. The method of claim 7, wherein the analyzing the application digest is performed on text strings that are associated with the application.

9. The method of claim 7, wherein the one or more indicators can include a category flag.

10. The method of claim 7, further comprising screening the application using the one or more indicators.

11. A method of updating a system which controls network access by programs on a workstation, the method comprising:
    detecting a network access request of an application;
    generating a hash value for the application, wherein the hash values includes network access data;
    comparing the generated hash value to one or more hash values in a hash/policy table that includes one or more policies associated with the one or more hash values;
    if the generated hash value matches one or more of the hash values in the hash/policy table, then applying the one or more policies that are associated with the one or more hash values;
    if the generated hash value does not match a hash value in the hash/policy table, then posting the application to a logging database;
    uploading the logging database to an application server module;
    determining whether the application from the logging database is operating in a predetermined manner based at least in part on analyzing past network activity involving the same or relevant applications and text strings associated with the application;
    if the application is not operating in the predetermined manner, then send the application digest to an application database factory, if the application is operating in the predetermined manner, then apply the one or more policies associated with the application;

determining whether the application has been previously analyzed;

for each application that was not previously analyzed, selecting one or more categories to associate with that application;

posting each application along with its selected one or more categories into a database of categorized applications; and receiving the database of categorized applications by the application server module.

12. The method of claim 11, further comprising scanning the logging database to determine a frequency count for the application.

13. The method of claim 11, further comprising:

posting each application along with its selected one or more categories into a database of applications; and receiving the database of applications for incorporation into the application inventory database.

14. A method of updating a system which controls operation of programs on a workstation, the method comprising:

detecting a program on a workstation accessing a network;

determining whether the program is in a network access database sending program data associated with the program to an application server module if the program is not in the network access database;

apply one or more policies that are associated with the program, wherein the network access database includes a protocol that is associated with the program;

receiving the program data from the workstation management module if the program was not in the network access database;

determine whether the program is operating in a predetermined manner based at least in part on analyzing past network activity involving the same or relevant programs and text strings associated with the program, if the program is not operating in the predetermined manner, then send the program data to an application database factory, if the program is operating in the predetermined manner, then provide the one or more policies associated with the program to the workstation management module;

determine whether the program was previously analyzed by the application database factory, if the program was not previously analyzed, then determining one or more policies to associate with the program and provide the one or more policies to the application server module;

receive the program data from the application server module if the program is not operating in the predetermined manner, if the program was previously analyzed, then providing the one or more policies that were previously associated with the program data to the application server module.

15. The method of claim 14, wherein the protocol is a transport protocol.

16. The method of claim 14, wherein the network access database comprises hash values.

17. The method of claim 14, wherein the network access database comprises one or more categories and one or more policies associated with the program.

* * * * *

UNITED STATES PATENT AND TRADEMARK OFFICE
CERTIFICATE OF CORRECTION

PATENT NO. : 9,692,790 B2  Page 1 of 1
APPLICATION NO. : 15/011371
DATED : June 27, 2017
INVENTOR(S) : Kester et al.

It is certified that error appears in the above-identified patent and that said Letters Patent is hereby corrected as shown below:

On the Title Page

On page 4, in Column 2, under "Other Publications", Line 7, delete "Supplementaty" and insert --Supplementary-- therefor On page 4, in Column 2, under "Other Publications", Line 18, delete "Coporation;" and insert --Corporation;-- therefor On page 6, in Column 1, under "Other Publications", Line 33, after "Provision", insert --of a copy--

In the Specification

In Column 5, Line 47, delete "101" and insert --200-- therefor

In Column 5, Line 56, delete "101" and insert --200-- therefor

In Column 6, Line 63, delete "108" and insert --208-- therefor

In Column 6, Line 66, delete "108" and insert --208-- therefor

In Column 12, Line 58, delete "104" and insert --200-- therefor

In Column 12, Line 63, delete "104." and insert --200.-- therefor

Signed and Sealed this
Twenty-eighth Day of April, 2020

Andrei Iancu
*Director of the United States Patent and Trademark Office*